US010840738B2

(12) United States Patent
Chien et al.

(10) Patent No.: US 10,840,738 B2
(45) Date of Patent: Nov. 17, 2020

(54) WIRELESS DEVICE

(71) Applicant: TDK TAIWAN CORP., Taoyuan (TW)

(72) Inventors: Feng-Lung Chien, Taoyuan (TW); Mao-Chun Chen, Taoyuan (TW); Hsiang-Hui Hsu, Taoyuan (TW); Kuo-Jui Lee, Taoyuan (TW); Chien-Hung Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 85 days.

(21) Appl. No.: 16/197,912

(22) Filed: Nov. 21, 2018

(65) Prior Publication Data

US 2019/0156996 A1    May 23, 2019

Related U.S. Application Data

(60) Provisional application No. 62/589,305, filed on Nov. 21, 2017, provisional application No. 62/595,820, filed on Dec. 7, 2017.

(30) Foreign Application Priority Data

Nov. 8, 2018 (CN) .................... 2018 2 1838071 U

(51) Int. Cl.
  *H02J 50/00* (2016.01)
  *H01F 38/14* (2006.01)
  *H02J 7/02* (2016.01)
  *H01F 27/28* (2006.01)
  *H02J 50/10* (2016.01)
  *H01F 27/00* (2006.01)

(52) U.S. Cl.
  CPC ............ *H02J 50/00* (2016.02); *H01F 27/006* (2013.01); *H01F 27/2804* (2013.01); *H01F 27/2823* (2013.01); *H01F 38/14* (2013.01); *H02J 7/025* (2013.01); *H02J 50/10* (2016.02)

(58) Field of Classification Search
  CPC .... H01F 38/14; H01F 27/2804; H01F 27/006; H01F 27/2823; H01F 27/29; H02J 50/10; H02J 50/12; H02J 50/70; H02J 7/025
  See application file for complete search history.

(56) References Cited

U.S. PATENT DOCUMENTS

2017/0228721 A1* 8/2017 Lee ...................... H04B 5/0081

\* cited by examiner

*Primary Examiner* — Carlos Amaya
(74) *Attorney, Agent, or Firm* — Muncy, Geissler, Olds & Lowe, P.C.

(57) ABSTRACT

A wireless device is provided and includes a first coil and at least one conductive assembly. The first coil includes a first metal wire and a second metal wire. The first metal wire is disposed on a first plane and has a first spiral structure. The second metal wire is disposed on a second plane and has a second spiral structure, and the second metal wire is electrically connected to the first metal wire. The conductive assembly has at least one metal connector. The conductive assembly is disposed on an innermost turn of the first spiral structure and an innermost turn of the second spiral structure.

19 Claims, 28 Drawing Sheets

WIRELESS DEVICE

CROSS REFERENCE TO RELATED APPLICATIONS

This application claims the benefit of U.S. Provisional Application No. 62/589,305, filed on Nov. 21, 2017, U.S. Provisional Application No. 62/595,820, filed on Dec. 7, 2017, and China Patent Application No. 201821838071.9, filed on Nov. 8, 2018, the entirety of which are incorporated by reference herein.

BACKGROUND OF THE DISCLOSURE

Field of the Disclosure

The present disclosure relates to a wireless device, and more particularly to a wireless device that has two metal wires on two layers.

Description of the Related Art

As technology has progressed, many kinds of electronic devices such as tablet computers and smartphones have begun to include the functionality of wireless charging. A user can place the electronic device on a wireless charging transmitting terminal, so that the wireless charging receiving terminal in the electronic device generates current by electromagnetic induction or electromagnetic resonance to charge the battery. Due to the convenience of wireless charging, electronic devices equipped with wireless charging modules have gradually become popular.

In general, a wireless charging device includes a magnetic conductive plate that supports a coil. When electricity is applied to the coil in a wireless charging mode or a wireless communication mode, the magnetic conductive plate can concentrate the magnetic lines of force emitted from the coil for better performance. However, the existing way in which such coils are wound does not meet the various requirements for wireless devices, such as better charging performance, communication performance, and less thickness.

Therefore, how to design a wireless device capable of meeting the various needs of the user is a topic nowadays that needs to be discussed and solved.

BRIEF SUMMARY OF THE DISCLOSURE

Accordingly, one objective of the present disclosure is to provide a wireless device to solve the above problems.

According to some embodiments of the disclosure, a wireless device is provided and includes a first coil and at least one conductive assembly. The first coil includes a first metal wire and a second metal wire. The first metal wire is disposed on a first plane and has a first spiral structure. The second metal wire is disposed on a second plane and has a second spiral structure, and the second metal wire is electrically connected to the first metal wire. The conductive assembly has at least one metal connector. The conductive assembly is disposed on the innermost turn of the first spiral structure and the innermost turn of the second spiral structure.

According to some embodiments, the wireless device further includes at least three conductive assemblies disposed on the penultimate turn of the first spiral structure and the penultimate turn of the second spiral structure.

According to some embodiments, the distance between every two adjacent metal connectors in the same conductive assembly is substantially equal.

According to some embodiments, the wireless device further includes a first connecting member which is separated from the second spiral structure.

According to some embodiments, the first metal wire further includes a separating wire, and the separating wire is separated from the first spiral structure.

According to some embodiments, the separating wire has a long-strip shaped structure, the innermost turn of the first spiral structure has a terminal section, and an extending direction of the terminal section is different from the extending direction of the separating wire.

According to some embodiments, the first spiral structure is coupled to the first connecting member via the second spiral structure and the separating wire in order.

According to some embodiments, a length of the first connecting member is greater than a sum of the width of each turn of the second spiral structure.

According to some embodiments, the second metal wire includes a plurality of straight sections and a plurality of curved sections, and the first connecting member cuts off a portion of the curved sections.

According to some embodiments, when viewed in a direction perpendicular to the first plane, the first connecting member and a terminal end of the first spiral structure form a hollow region.

According to some embodiments, the wireless device further includes a first connecting member, and the first connecting member does not cut off a portion of the second spiral structure.

According to some embodiments, the first connecting member does not cut off the innermost turn of the second spiral structure.

According to some embodiments, a width of the innermost turn of the first spiral structure is narrower than a width of the outermost turn of the first spiral structure.

According to some embodiments, the first spiral structure has an intermediate turn disposed between the innermost turn and the outermost turn. A first slit is formed on the intermediate turn, and the first slit divides the intermediate turn into a left portion and a right portion, and a width of the left portion or the right portion is smaller than the width of the innermost turn of the first spiral structure.

According to some embodiments, a width of each successive turn of the first spiral structure gradually increases from the innermost turn to the outermost turn.

According to some embodiments, the first spiral structure includes a plurality of straight sections and a plurality of curved sections, and a width of each curved section is greater than a width of a straight section connected thereto.

According to some embodiments, the first metal wire has a plurality of slits respectively formed on the curved sections.

According to some embodiments, the wireless device further includes an electrical connecting portion which is connected to an end of the innermost turn of the first spiral structure.

According to some embodiments of the disclosure, the wireless device further includes a first connecting member and an electrical connecting portion. The first connecting member is connected to the penultimate turn of the second spiral structure. The electrical connecting portion is connected to the last turn of the second spiral structure.

According to some embodiments, the wireless device further includes a first connecting member connected to the penultimate turn of the second spiral structure, and when viewed in a direction perpendicular to the first plane, the innermost turn of the first spiral structure and the penultimate turn of the second spiral structure partially overlap.

According to some embodiments, the wireless device further includes a second coil, and the second coil includes a third metal wire and a fourth metal wire. The third metal wire is disposed on the first plane and surrounds the first metal wire. The fourth metal wire is disposed on the second plane and surrounds the second metal wire. The first coil operates in a near field communication band, and the second coil operates as the transmitting terminal or the receiving terminal in electrical power transmission.

The present disclosure provides a wireless device including a coil unit. In some embodiments, the coil unit may include a first coil, and the first coil may further include a first metal wire and a second metal wire. The second metal wire is electrically connected to the first metal wire by at least one conductive assembly, and the conductive assembly can be disposed on the innermost turns of the first metal wire and the second metal wire, so that the current density of the coil unit can be more uniform, and the current is not easily concentrated in a specific portion to generate unnecessary heat energy, thereby improving the overall efficiency.

In addition, in some embodiments, the coil unit may further include a second coil. The first coil can operate in a near field communication (NFC) band, and the second coil can operate as either the transmitting terminal or the receiving terminal in electrical power transmission, so as to perform a wireless charging function. Therefore, the wireless device can perform the functions of wireless communication and wireless charging at the same time.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
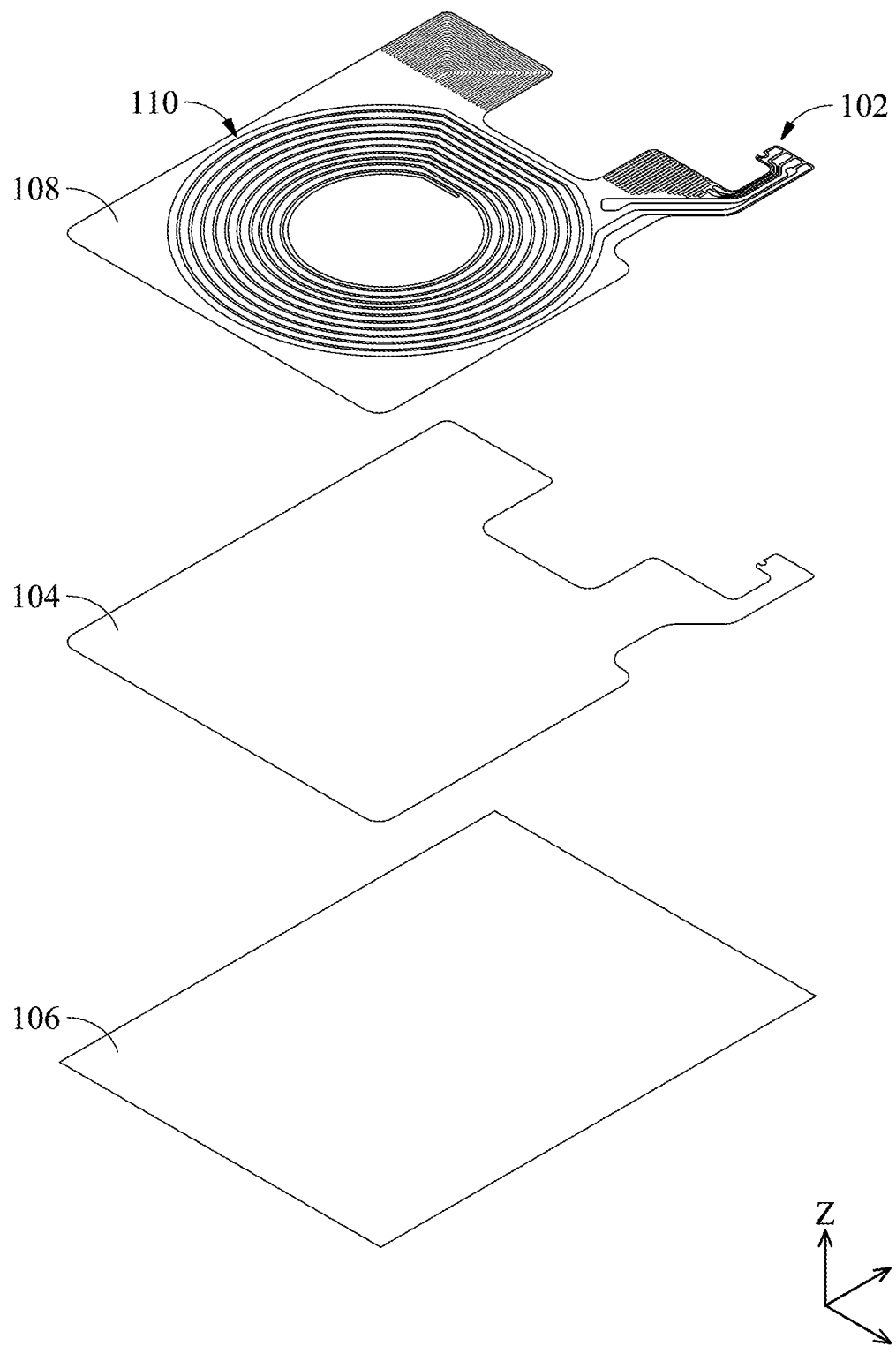
FIG. 1 is an exploded view of a wireless device in accordance with an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that component for specific description or specific figures can be present in any form with which a skilled person is familiar. In addition, when a layer is "above" other layers or a substrate, it might be "directly" on the layers or the substrate, or some other layers may be between the layer and the other layers.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is an exploded view of a wireless device 100 in accordance with an embodiment of the present disclosure. As shown in FIG. 1, the wireless device 100 can include a coil unit 102, an adhesive layer 104 and a magnetic conductive plate 106. In this embodiment, the coil unit 102 is disposed on the magnetic conductive plate 106, and the coil unit 102 is connected to the magnetic conductive plate 106 by the adhesive layer 104. The adhesive layer 104 can be a tape or any other material that can be used for connection.

In addition, in this embodiment, the magnetic conductive plate 106 may be a ferrite, but it is not limited thereto. For example, in other embodiments, the magnetic conductive plate 106 may also include a nanocrystalline material. The magnetic conductive plate 106 may have a magnetic permeability corresponding to the coil unit 102 so that the electromagnetic waves of the coil unit 102 can be more concentrated.

As shown in FIG. 1, the coil unit 102 includes a substrate 108 and a coil structure 110, and the coil structure 110 is formed on the substrate 108. In this embodiment, the substrate 108 is a flexible circuit board, but it is not limited thereto. Any substrate that can be used to form the coil structure 110 is within the scope of the present disclosure. Furthermore, the coil unit 102 can function as a charging coil for wirelessly charging an external electronic device, such as a tablet computer or a smart phone.

For example, the coil structure 110 of coil unit 102 can operate as a resonant charging coil based on the standard of the Alliance for Wireless Power (A4WP), but it is not limited thereto. In addition, the coil structure 110 can operate as an inductive charging coil based on the standard of Wireless Power Consortium (WPC), such as the Qi standard. Therefore, the wireless device 100 can respond to different forms of charging so as to enlarge the range of applications in this embodiment. For example, in the case of a close distance (for example, 1 cm or less), the inductive type operation is used; and at a long distance, a resonance type operation is used.

Figure 2:
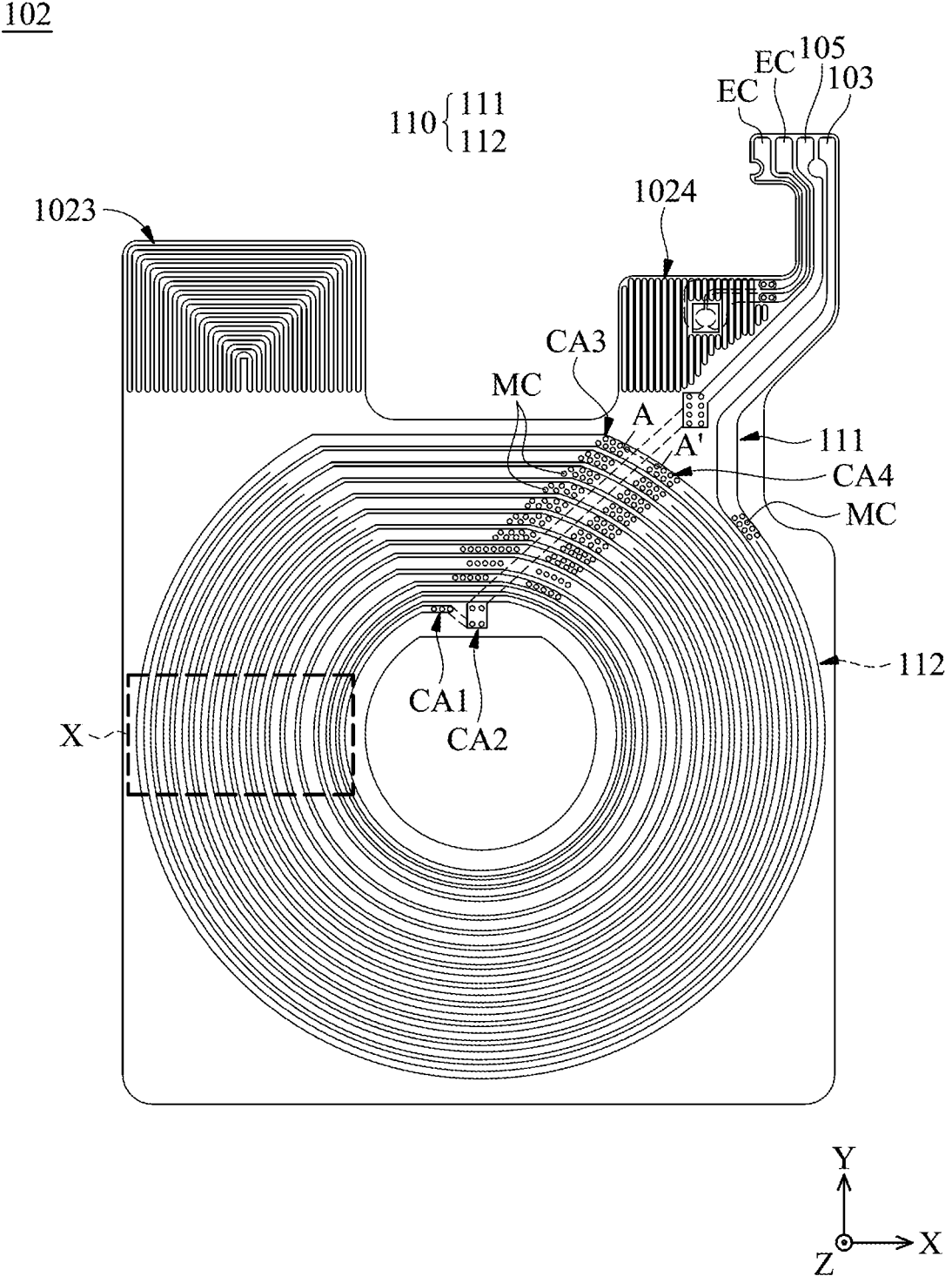
FIG. 2 is a top view of the coil unit according to an embodiment of the present disclosure.
Figure 3:
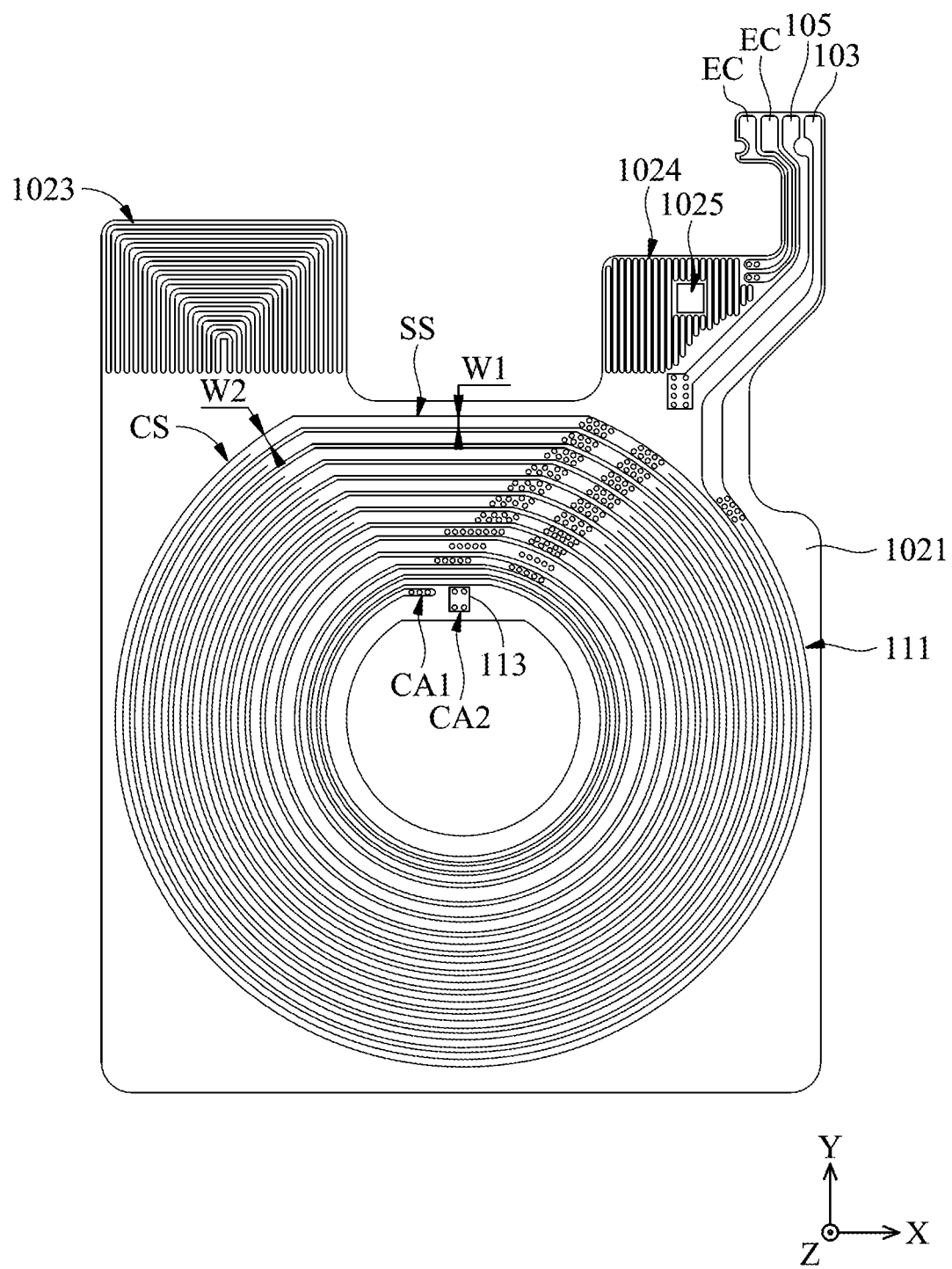
FIG. 3 is a schematic diagram of an upper layer structure of the coil unit on a first plane according to an embodiment of the present disclosure.
Figure 4:
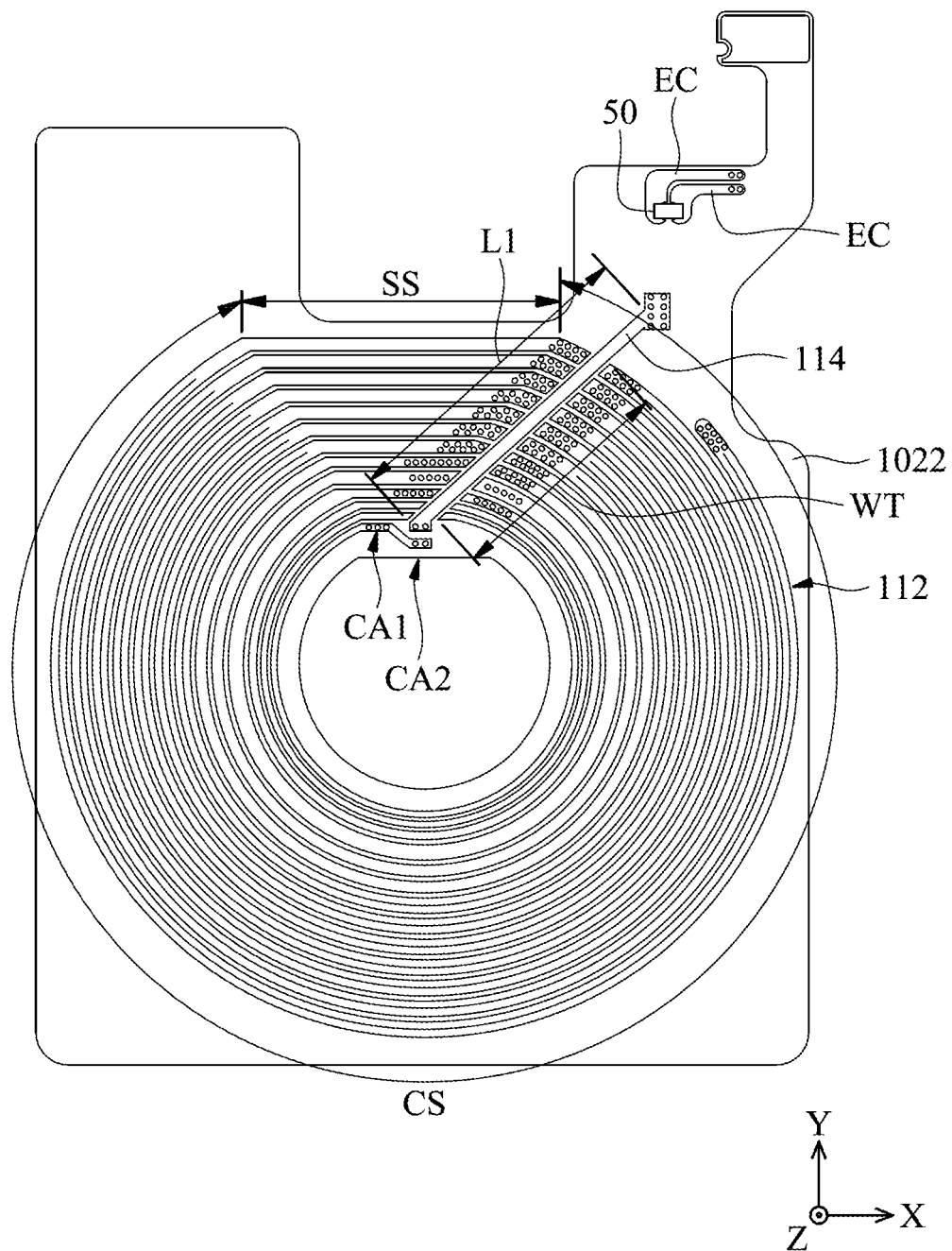
FIG. 4 is a schematic diagram of a lower layer structure of the coil unit on a second plane according to this embodiment of the present disclosure.

Next, please refer to FIG. 2 to FIG. 4. FIG. 2 is a top view of the coil unit 102 according to an embodiment of the present disclosure. FIG. 3 is a schematic diagram of an upper layer structure of the coil unit 102 on a first plane 1021 according to an embodiment of the present disclosure. FIG. 4 is a schematic diagram of a lower layer structure of the coil unit 102 on a second plane 1022 according to this embodiment of the present disclosure. It should be noted that the coil structure in FIG. 4 should be located below the second plane 1022, but for the sake of clarity, the coil structure in FIG. 4 is still illustrated by a solid line.

As shown in FIG. 3 and FIG. 4, the coil structure 110 (the first coil) of the coil unit 102 may include a first metal wire 111 and a second metal wire 112, the first metal wire 111 is disposed on the first plane 1021, and the second metal wire 112 is disposed on the second plane 1022. As shown in FIG. 3, the coil unit 102 has a first terminal contact 103 and a second terminal contact 105, configured to be electrically connected to an external circuit, such as a control chip.

Next, as shown in FIG. 3 and FIG. 4, the first metal wire 111 forms a first spiral structure, and the second metal wire 112 forms a second spiral structure whose shape and width substantially correspond to that of the first spiral structure. The first metal wire 111 is configured to be connected to the first terminal contact 103, the second metal wire 112 is configured to be electrically connected to the second terminal contact 105, and the second metal wire 112 is configured to be electrically connected to the first metal wire 111.

Furthermore, the coil unit 102 may further include one or more conductive assemblies, and each of the conductive assemblies includes a plurality of metal connectors MC (also referred to as via) configured to penetrate the substrate 108 to connect the first metal wire 111 and the second metal wire 112. For example, as shown in FIG. 2 to FIG. 4, the coil unit 102 has a conductive assembly CA1 and a conductive assembly CA2 which are disposed on the innermost turn of the first and second spiral structures and are configured to connect the first metal wire 111 and the second metal wire 112. By providing the plurality of metal connectors MC, the current density of the coil unit 102 can be more uniformly distributed, so that the current is not easily concentrated on a specific portion to generate unnecessary heat energy, thereby improving overall efficiency.

As shown in FIG. 3, the first metal wire 111 further includes a separating wire 113, and the separating wire 113 is located within the first spiral structure of the first metal wire 111 and is separated from the first spiral structure. Furthermore, as shown in FIG. 4, the second metal wire 112 may include a plurality of straight sections SS and a plurality of curved sections CS. In this embodiment, the width of each curved section CS is greater than the width of the straight section SS connected thereto. For example, as shown in FIG. 3, the outermost straight section SS has a width W1, the curved section CS connected thereto has a width W2, and the width W2 is greater than the width W1. Based on the structural design, the area of the coil unit 102 can be reduced, so as to achieve the purpose of miniaturization of the wireless device 100.

It should be noted that, as shown in FIG. 2 to FIG. 4, the coil unit 102 further includes a first connecting member 114, the first connecting member 114 is separated from the foregoing second spiral structure, and the first spiral structure is coupled to the first connecting member 114 via the conductive assembly CA1, the second spiral structure, the separating wire 113 and the conductive assembly CA2 (the order of coupling may also be reversed).

Furthermore, as shown in FIG. 4, the first connecting member 114 has a length L1, and the sum of the width of each turn of the second spiral structures is WT (along the extending direction of the first connecting member 114). In this embodiment, the length L1 is greater than the sum of width WT, so that the coil structure 110 is not easily to result in undesirable problems (such as short circuits) due to manufacturing errors. Furthermore, in this embodiment, as shown in FIG. 4, the first connecting member 114 is extended from the inner side of the second spiral structure to the outer side of the second spiral structure and cuts off a portion of the curved sections CS.

Figure 5:
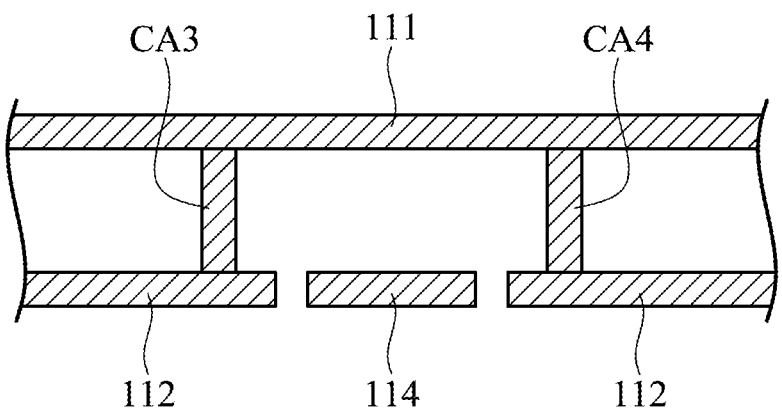
FIG. 5 is a cross-sectional view along line A-A' in FIG. 2 according to an embodiment of the present disclosure.

In addition, please refer to FIGS. 2 and 5. FIG. 5 is a cross-sectional view along line A-A' in FIG. 2 according to an embodiment of the present disclosure. In this embodiment, as shown in FIG. 2, the coil unit 102 may further include a plurality of conductive assemblies disposed on both sides of the first connecting member 114. As shown in FIG. 2 and FIG. 5, the conductive assembly CA3 and the conductive assembly CA4 can help a portion the first spiral structure of the first metal wire 111 to be connected to a portion of the second spiral structure of the second metal wire 112 in parallel. Therefore, the effect of reducing the overall impedance of the unit 102 can be achieved, and the number of turns of the coil structure 110 of the coil unit 102 can also be increased.

Furthermore, as shown in FIG. 2, the plurality of metal connectors MC included in each conductive assembly is arranged along the direction of the first metal wire 111. For example, the metal connectors MC in the conductive assembly CA3 are arranged in pairs along the extending direction of the first metal wire 111.

Figure 6:
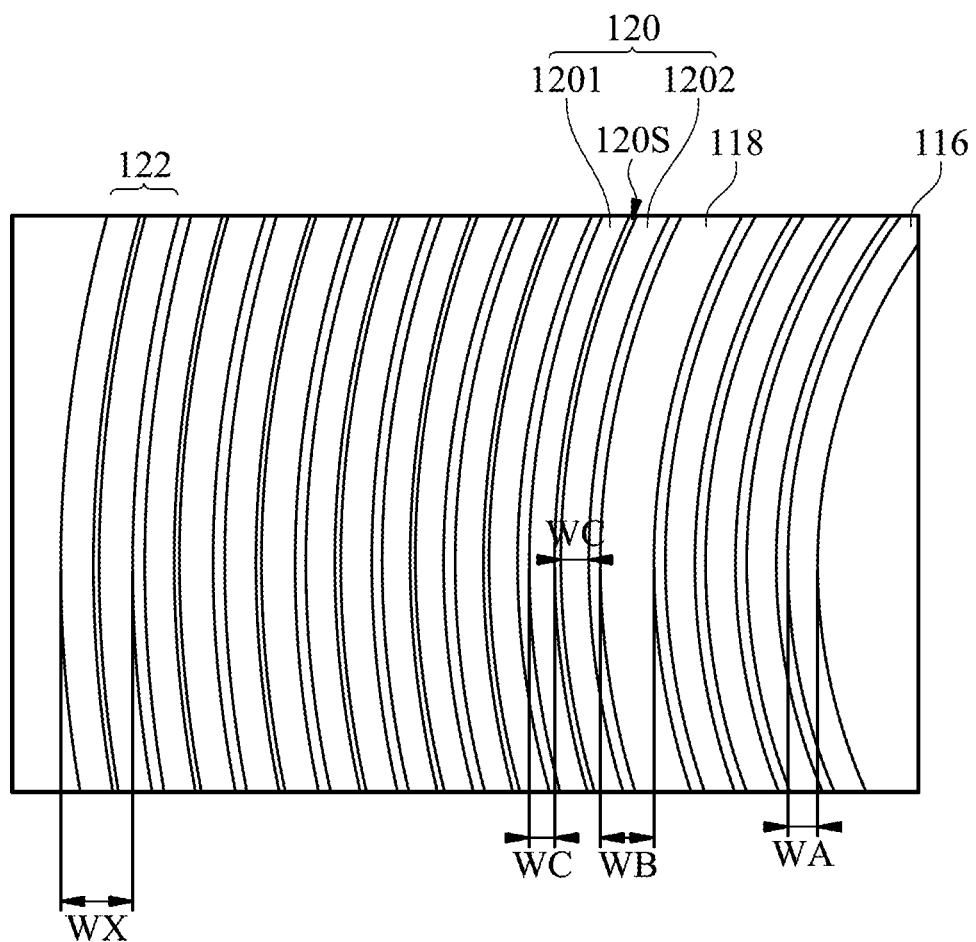
FIG. 6 is an enlarged diagram of a region X in FIG. 2 according to an embodiment of the present disclosure.

Next, please refer to FIG. 6, which is an enlarged diagram of a region X in FIG. 2 according to an embodiment of the present disclosure. As shown in FIG. 6, the first spiral structure has an innermost turn 116, a first intermediate turn 118, a second intermediate turn 120, and an outermost turn 122. The innermost turn 116 has a width WA, the outermost turn 122 has a width WX, and the width WA of the innermost turn 116 is narrower than the width WX of the outermost turn 122. In various embodiments of the present disclosure, the widths of different turns in the first metal wire 111 may be correspondingly modified according to the strength of the magnetic field. For example, a narrower width is adopted for a stronger magnetic field, so that the resistance value is higher, and therefore the loss due to the Eddy current can be reduced.

In this embodiment, a plurality of slits may be formed on the first spiral structure of the first metal wire 111, which are respectively formed on the curved sections CS. Specifically, as shown in FIG. 6, the first intermediate turn 118 and second intermediate turn 120 are disposed between the innermost turn 116 and the outermost turn 122, and a first slit 120S is formed on the second intermediate turn 120. In addition, the first slit 120S divides the second intermediate turn 120 into a left portion 1201 and a right portion 1202. Each of the left portion 1201 and the right portion 1202 has a width WC, and the width WC is smaller than the width WA of the innermost turn 116 of the first spiral structure.

Furthermore, in this embodiment, the width of each successive turn of the first spiral structure may increase gradually from the innermost turn to the outermost turn. That is, the width WA is smaller than the width WB of the first intermediate turn 118, the width WB is smaller than the width WX of the outermost turn 122, and the width WC is smaller than the width WA. Based on the structural configuration of this embodiment, the loss due to Eddy current can be reduced, and the current density can be more uniform.

In addition, in some embodiments of the present disclosure, as shown in FIG. 2 and FIG. 3, in order to enhance the overall strength of the coil unit 102, the coil unit 102 may further include a plurality of dummy metal wires which is disposed on the first plane 1021. In this embodiment, the coil unit 102 includes a plurality of dummy metal wires 1023 and dummy metal wires 1024, and the dummy metal wires 1024 are adjacent to the first terminal contact 103 and the second terminal contact 105. The dummy metal wires 1023 and the dummy metal wires 1024 are electrically independent from the first metal wire 111 and the second metal wire 112, and the plurality of dummy metal wires 1023 and the plurality of dummy metal wires 1024 are electrically independent from each other.

By disposing the dummy metal wires 1023 and the dummy metal wires 1024, the local hardness of the substrate 108 can be increased, and the dummy metal wires 1023 and the dummy metal wires 1024 can be used to assist the substrate 108 to be positioned so as to improve positioning accuracy and convenience of assembly. In this embodiment, the dummy metal wires 1023 and the dummy metal wires 1024 are implemented by a line shape, but they are not limited thereto. For example, in other embodiments, they may also be implemented by a circular shape, a rectangular shape and so on.

In FIG. 3, the coil unit 102 may further include a metal block 1025 disposed on the first plane 1021 to further increase the overall strength of the coil unit 102. Moreover, a plurality of dummy metal wires 1024 surrounds the metal block 1025 and is electrically independent from the metal block 1025.

In addition, in the embodiment of FIG. 4 of the present disclosure, the wireless device 100 may further include at least one electronic component 50 disposed on the second plane 1022, and the electronic component 50 is configured to be electrically connected to the two electrical contacts EC. The electronic component 50 is disposed on a position corresponding to the position of the metal block 1025 and the dummy metal wires 1024 on the first plane 1021. Therefore, the electrical contacts EC soldered to the electronic component 50 are not easily damaged by the impact, thereby improving the reliability of the wireless device 100.

Figure 7:
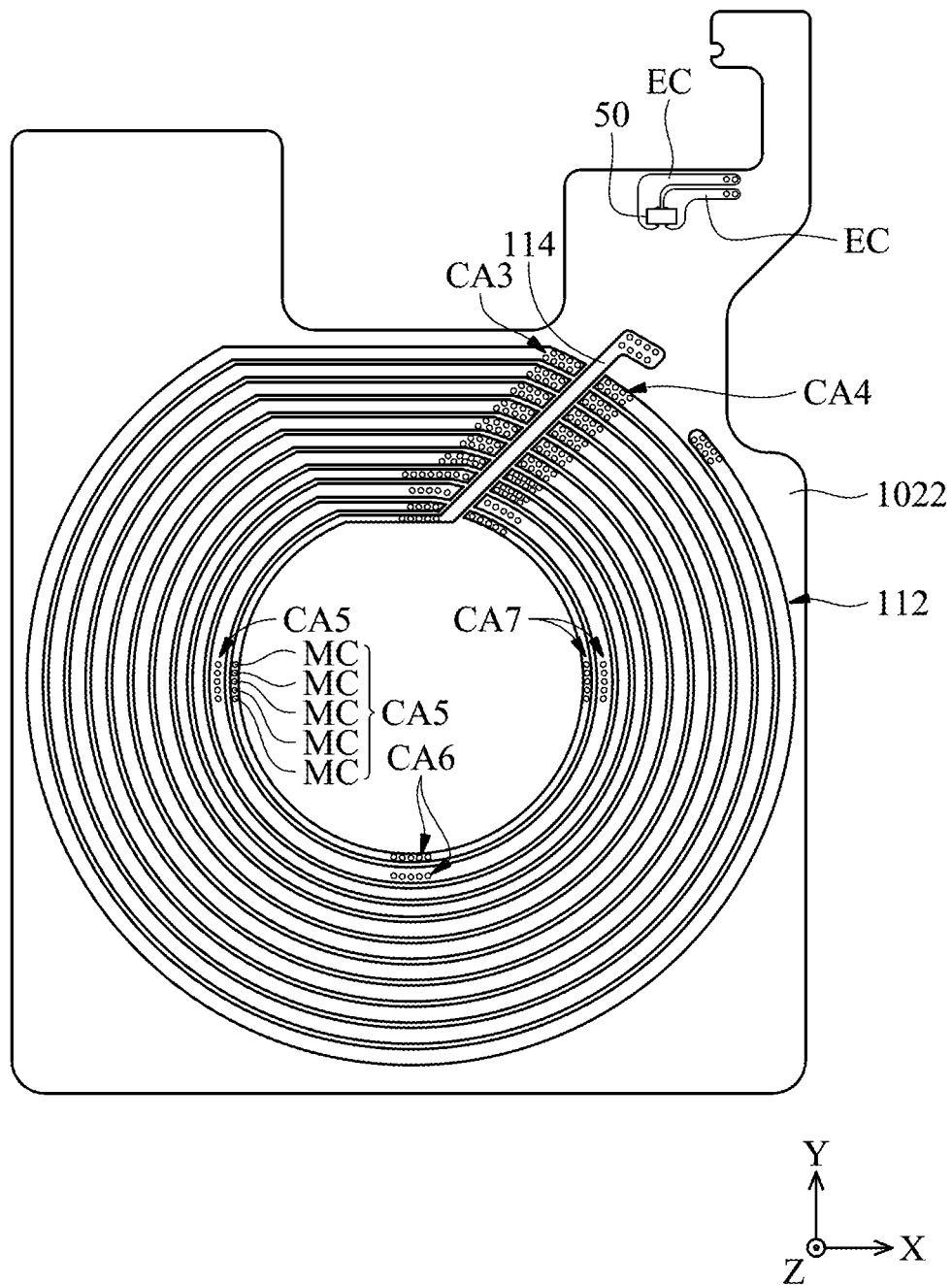
FIG. 7 is a schematic diagram of a coil unit in a second plane according to another embodiment of the present disclosure.

Please refer to FIG. 7. FIG. 7 is a schematic diagram of a coil unit 102A in a second plane 1022 according to another embodiment of the present disclosure. The coil unit 102A is similar to the coil unit 102 in FIG. 4, and their difference is that the coil unit 102A in this embodiment includes at least three conductive assemblies disposed on the penultimate turns of the first and second spiral structures, and the conductive assemblies are configured to be electrically connected to the first spiral structure and the second spiral structure. (The first spiral structure is the same as that in FIG. 3, and therefore is omitted herein).

Specifically, in this embodiment, as shown in FIG. 7, the coil unit 102A includes two conductive assemblies CA5, two conductive assemblies CA6, and two conductive assemblies CA7. In this embodiment, the conductive assembly CA5 disposed on the innermost turn may include five metal connectors MC, and distances between every two adjacent metal connectors MC are substantially equal. In addition, the conductive assembly CA5, the conductive assembly CA6, and the conductive assembly CA7 are disposed at equal intervals along the extending direction of the second metal wire 112, so that the structural strength of the coil unit 102A can be improved, and the current density can be more uniform.

Based on the structural design of this embodiment, the structural strength of the coil unit 102A can be increased, and the current density can also be more uniform.

Figure 8:
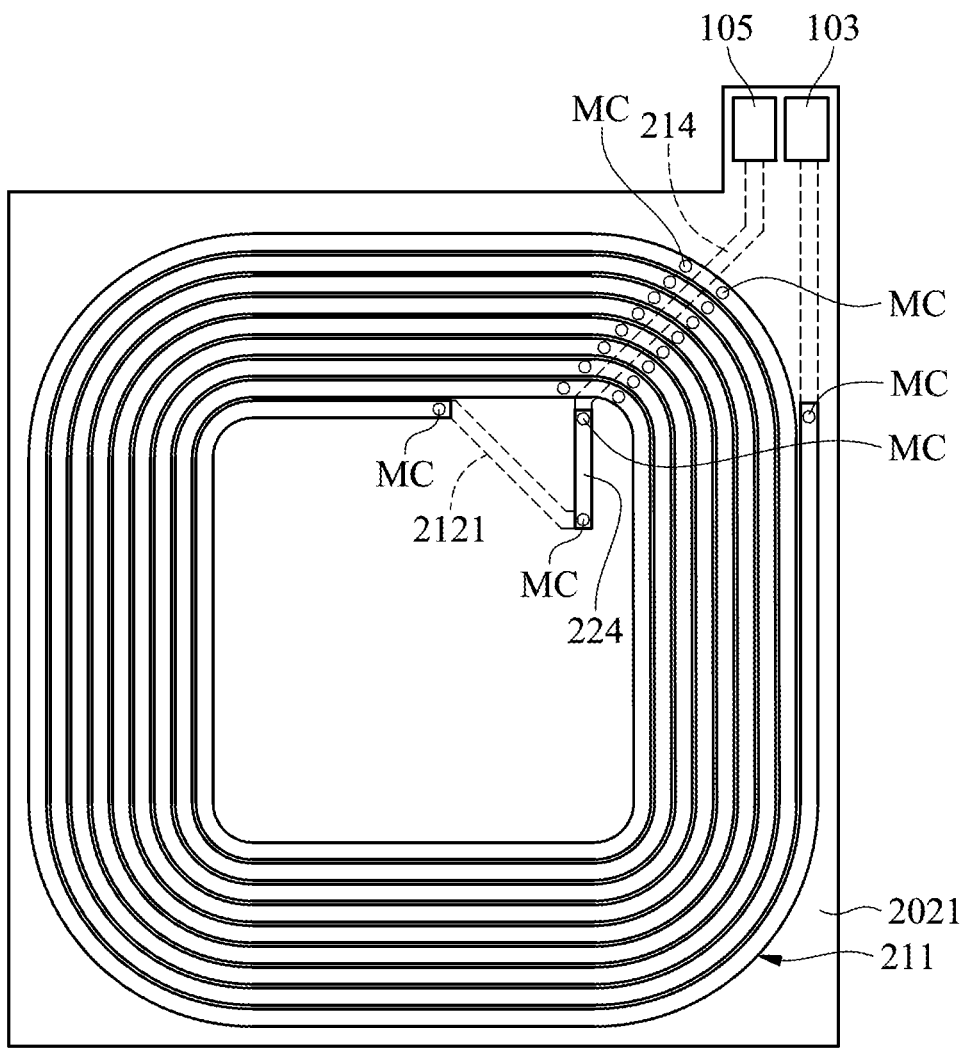
FIG. 8 is a top view of a coil unit of a wireless device according to another embodiment of the present disclosure.
Figure 9:
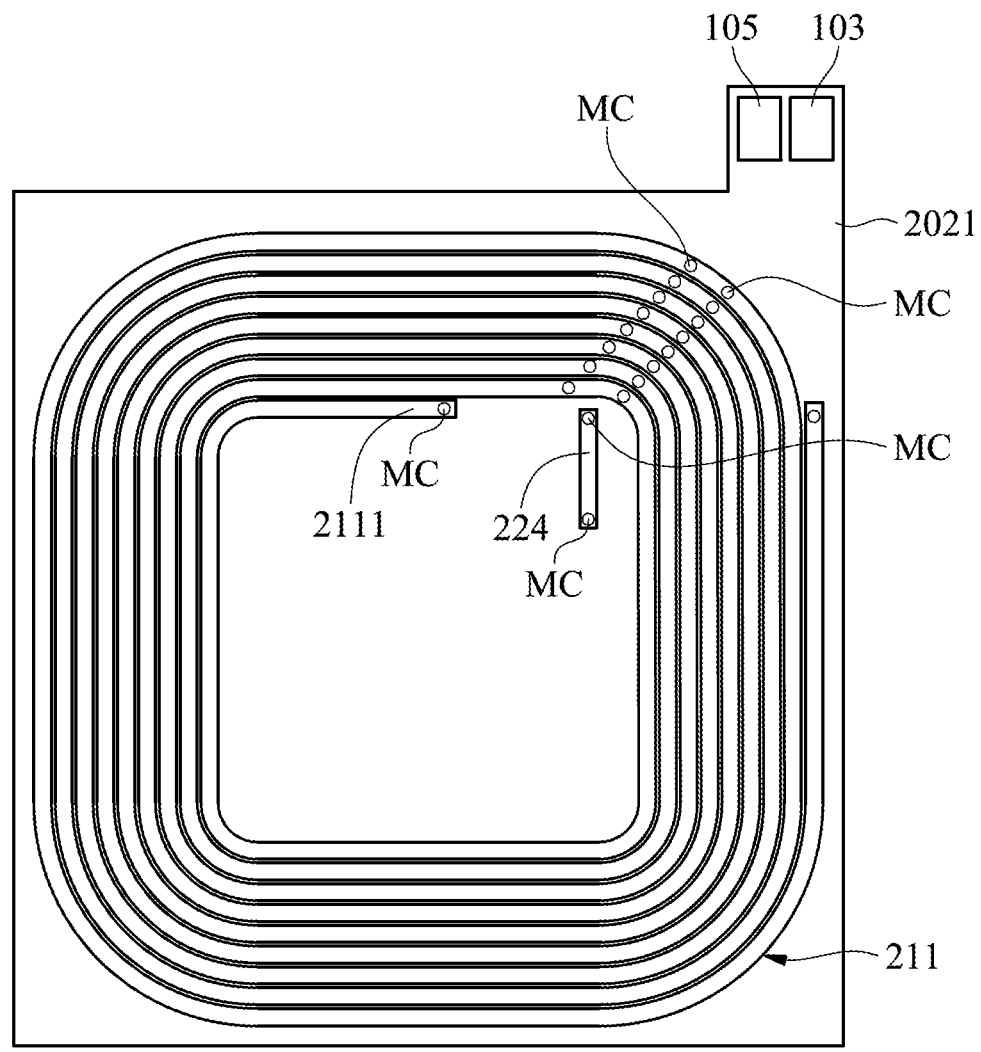
FIG. 9 is a schematic diagram of an upper layer structure of the coil unit on a first plane according to the embodiment of the present disclosure.
Figure 10:
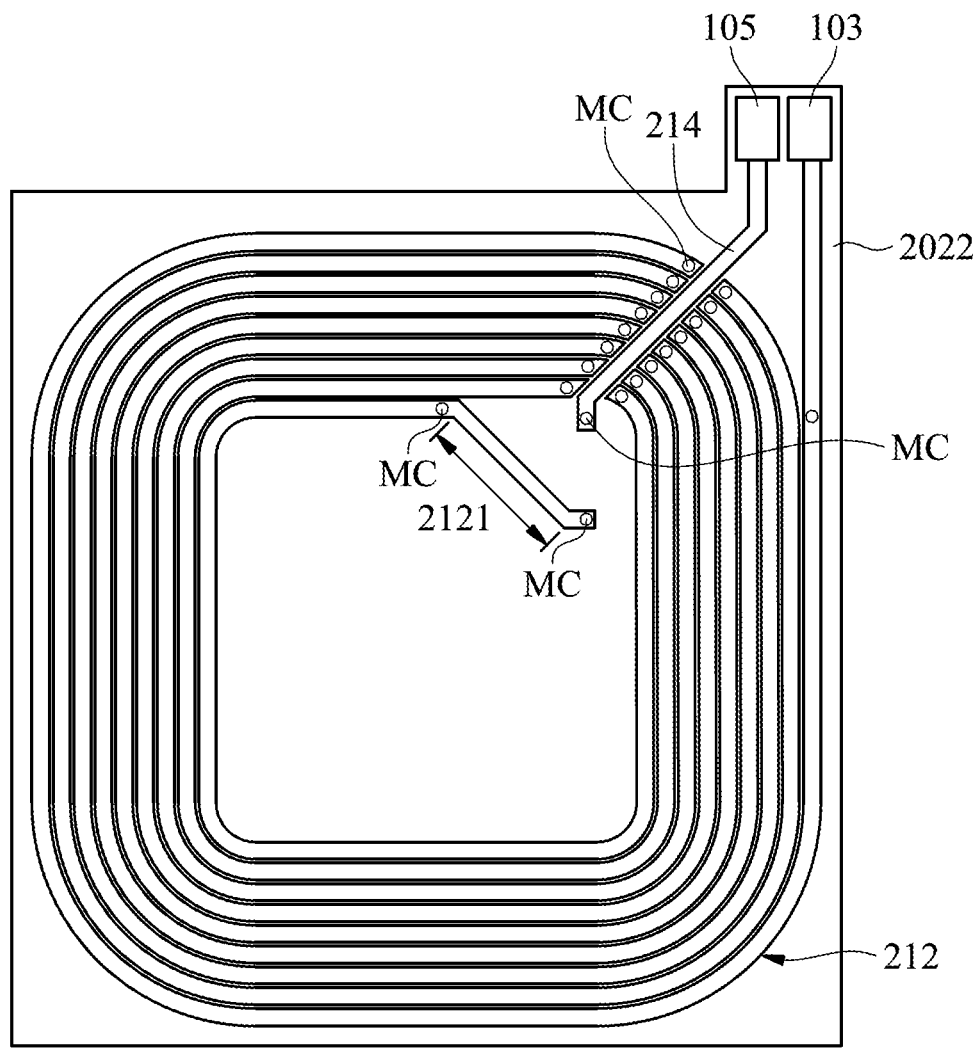
FIG. 10 is a schematic diagram of a lower layer structure of the coil unit on a second plane according to this embodiment of the present disclosure.

Please refer to FIG. 8 to FIG. 10, FIG. 8 is a top view of a coil unit 202 of a wireless device according to another embodiment of the present disclosure, FIG. 9 is a schematic diagram of an upper layer structure of the coil unit 202 on a first plane 2021 according to the embodiment of the present disclosure, and FIG. 10 is a schematic diagram of a lower layer structure of the coil unit 202 on a second plane 2022 according to this embodiment of the present disclosure. In this embodiment, the coil unit 202 includes a first metal wire 211 and a second metal wire 212 which are respectively disposed on the first plane 2021 and the second plane 2022, and the first metal wire 211 and the second metal wire 212 respectively form a first spiral structure and a second spiral structure.

As shown in FIG. 10, the coil unit 202 further includes a first connecting member 214 which is separated from the second spiral structure. Moreover, as shown in FIG. 8, the first metal wire 211 further includes a separating wire 224 which is configured to connect the first connecting member 214 and the second metal wire 212 by the metal connector MC. In this embodiment, as shown in FIG. 9, the separation wire 224 has a long-strip shaped structure, the innermost turn of the first spiral structure has a terminal section 2111, and an extending direction of the terminal section 2111 is different from the extending direction of the separating wire 224. In this embodiment, the extending direction of the terminal section 2111 is substantially perpendicular to the extending direction of the separating wire 224, but it is not limited to this embodiment.

Based on the design of the terminal section 2111 and the separating wire 224 extending in different directions, the contact area of the coil unit 202 with other components can be increased, thereby improving the heat dissipation effect. In addition, as shown in FIG. 10, the second metal wire 212 may also provide a non-parallel section 2121 to further improve the heat dissipation effect. Furthermore, the efficiency of the coil can be optimized by adjusting the gap between turns of the coils based on the corresponding strength of the electromagnetic field.

Figure 11:
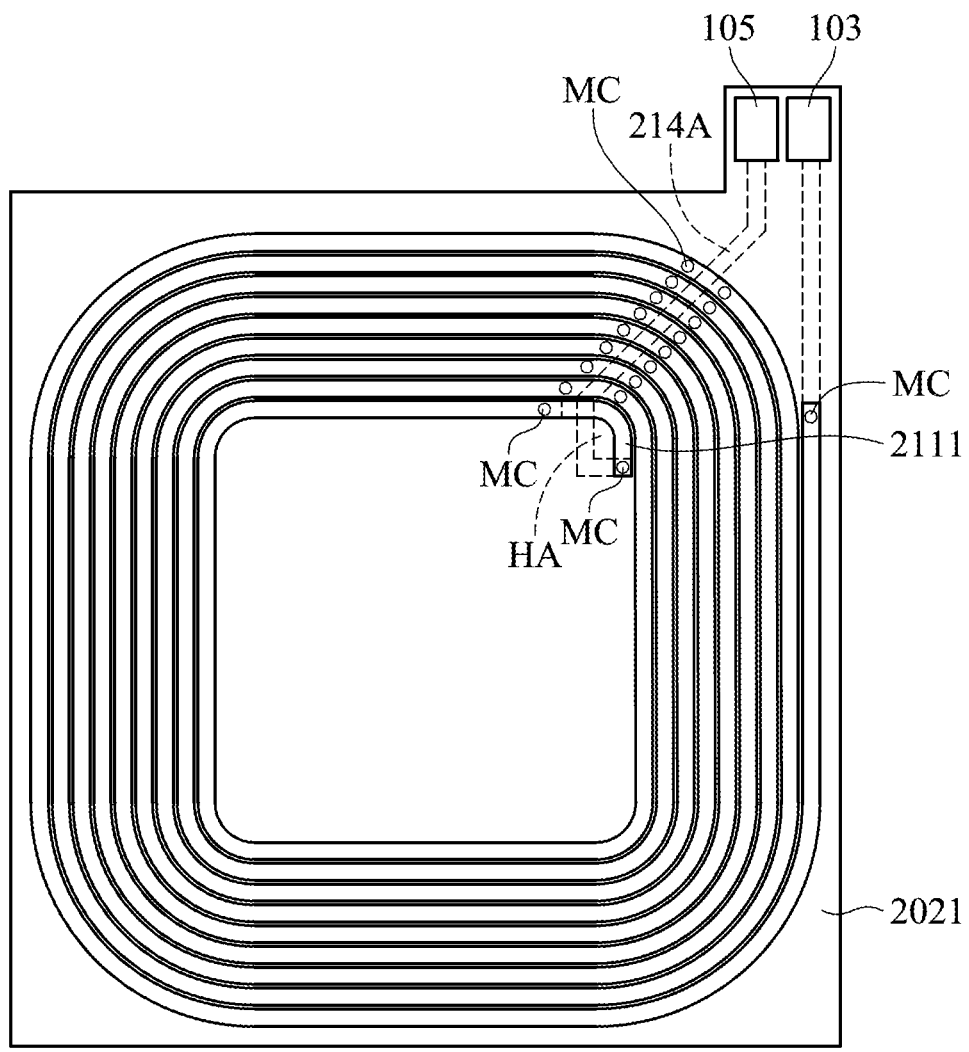
FIG. 11 is a top view of a coil unit of a wireless device according to another embodiment of the present disclosure.
Figure 12:
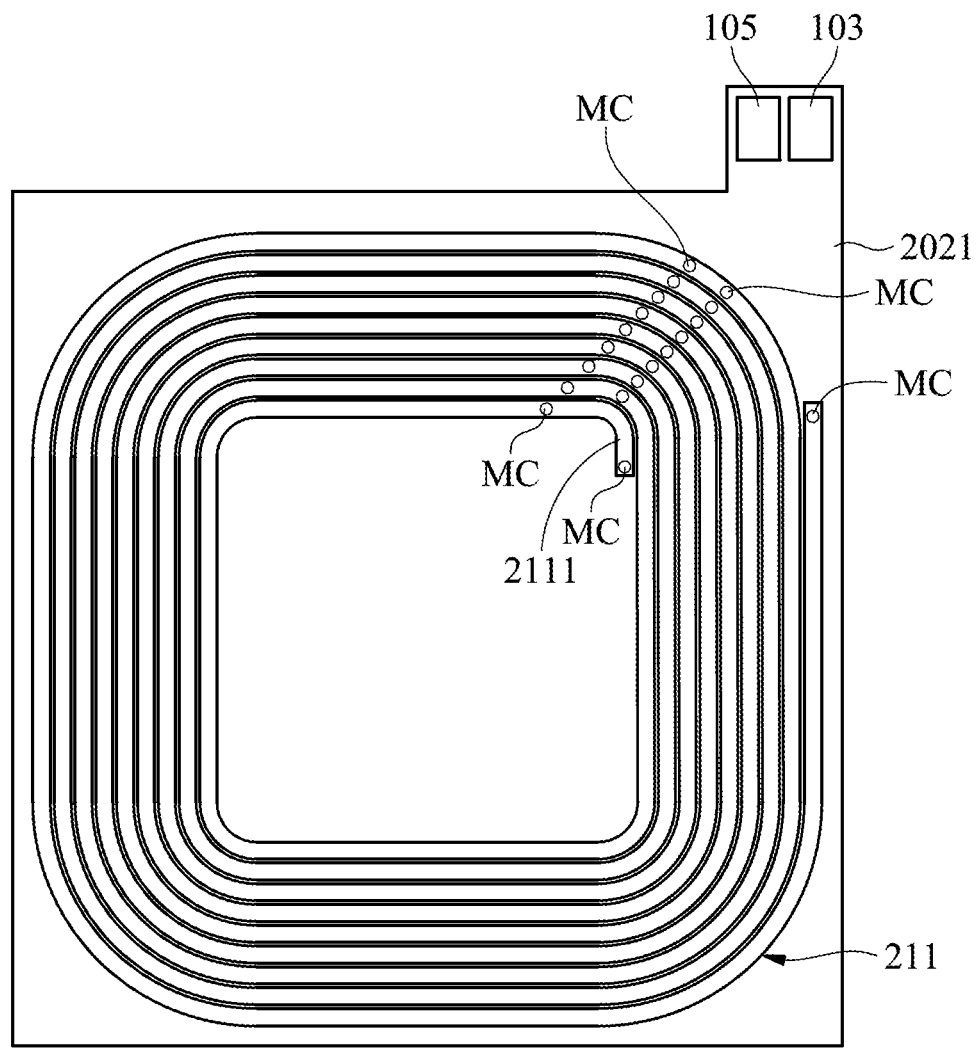
FIG. 12 is schematic diagram of an upper layer structure of the coil unit on a first plane according to the embodiment of the present disclosure.
Figure 13:
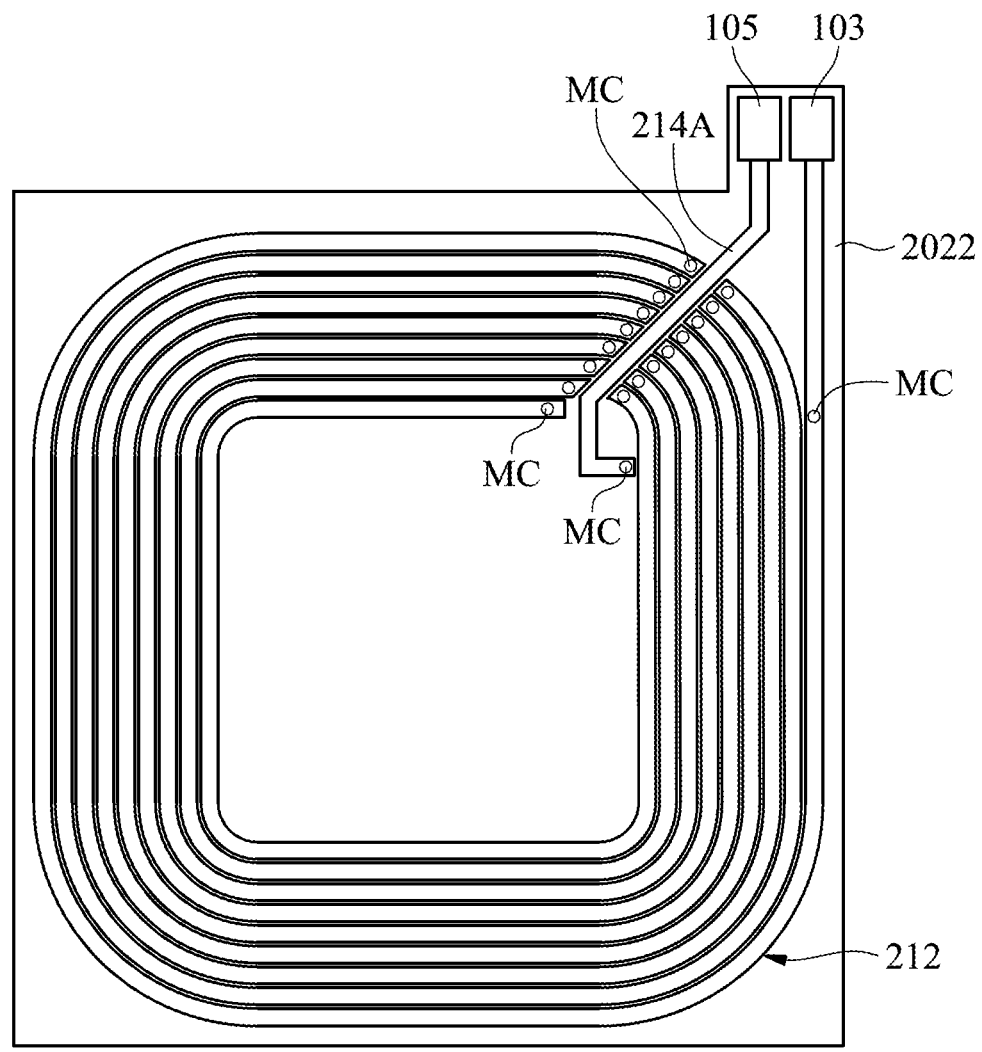
FIG. 13 is a schematic diagram of a lower layer structure of the coil unit on a second plane according to this embodiment of the present disclosure.

Please refer to FIG. 11 to FIG. 13, FIG. 11 is a top view of a coil unit 202A of a wireless device according to another embodiment of the present disclosure, FIG. 12 is schematic diagram of an upper layer structure of the coil unit 202A on a first plane 2021 according to the embodiment of the present disclosure, and FIG. 13 is a schematic diagram of a lower layer structure of the coil unit 202A on a second plane 2022 according to this embodiment of the present disclosure.

The coil unit 202A in this embodiment is similar to the coil unit 202, and the difference is that, in this embodiment, when viewed in a direction perpendicular to the first plane 2021, as shown in FIG. 11, the first connecting member 214A and a terminal end (the terminal section 2111) of the first spiral structure of the first metal wire 211 form a hollow region HA. Based on the structural design of this embodiment, the induction efficiency and the heat dissipation efficiency of the coil unit 202A can be improved.

Figure 14:
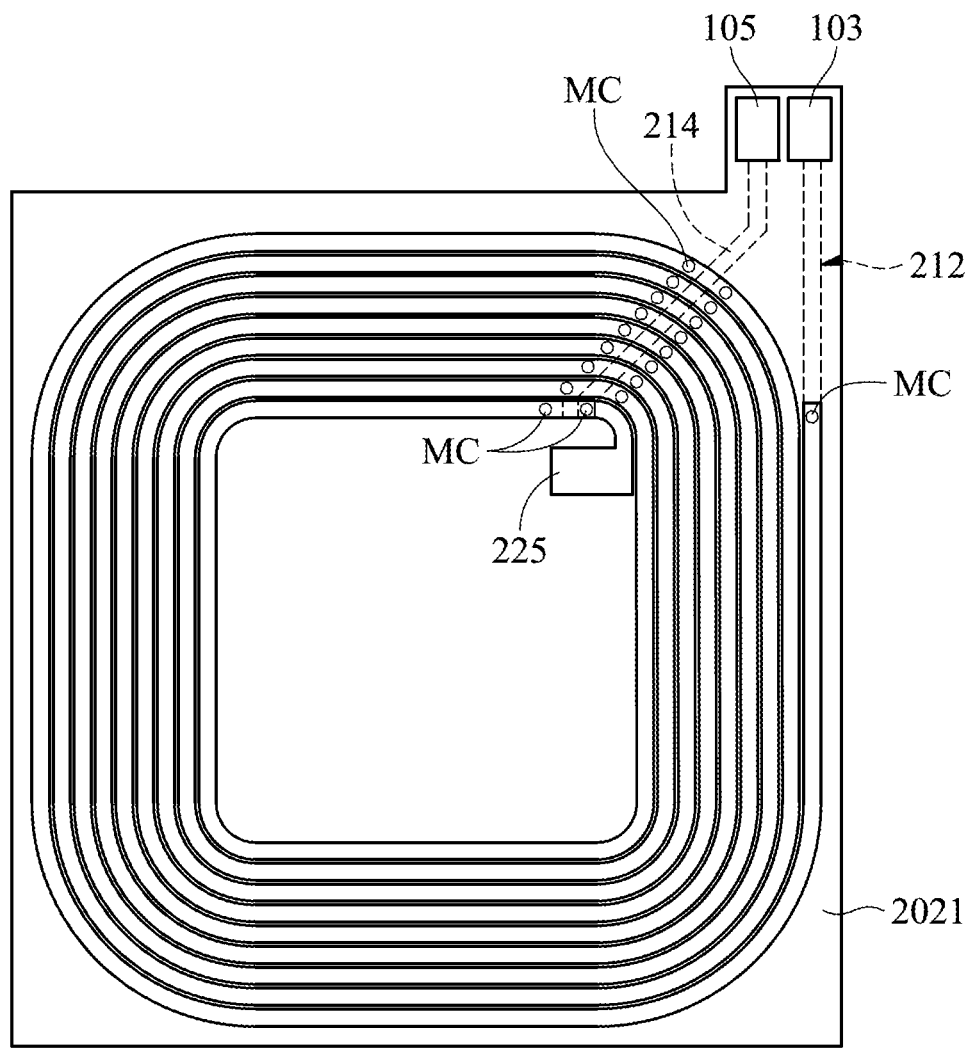
FIG. 14 is a top view of a coil unit of a wireless device according to another embodiment of the present disclosure.
Figure 15:
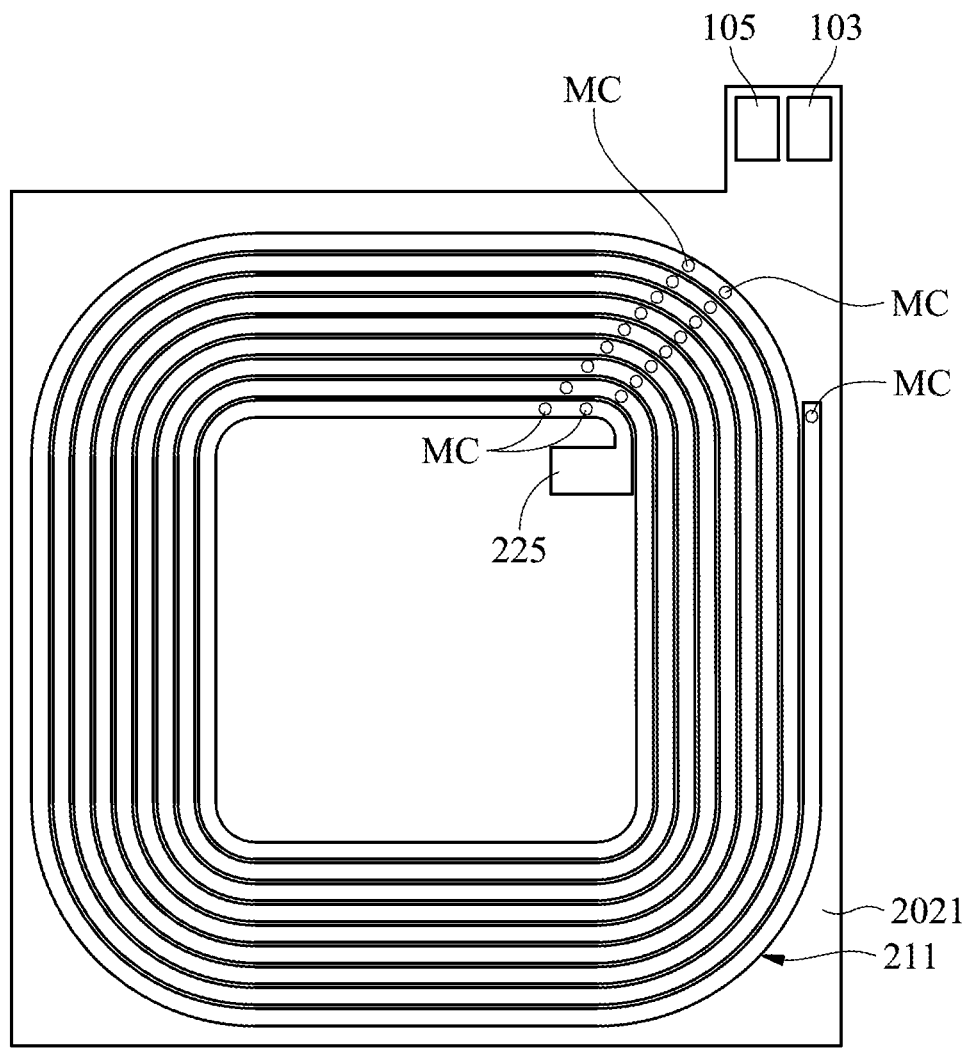
FIG. 15 is a schematic diagram of an upper layer structure of the coil unit on the first plane according to the embodiment of the present disclosure.
Figure 16:
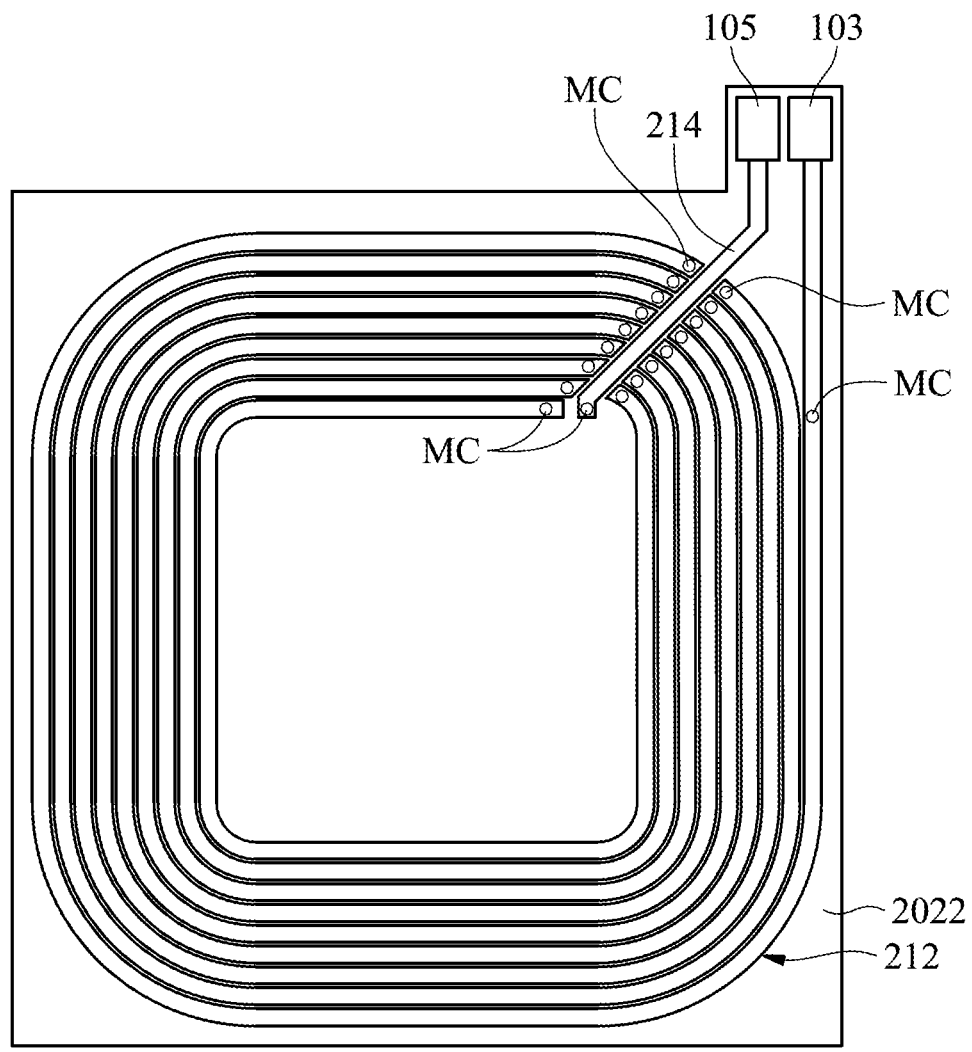
FIG. 16 is a schematic diagram of a lower layer structure of the coil unit on the second plane according to this embodiment of the present disclosure.

Please refer to FIG. 14 to FIG. 16, FIG. 14 is a top view of a coil unit 202B of a wireless device according to another embodiment of the present disclosure, FIG. 15 is a schematic diagram of an upper layer structure of the coil unit 202B on the first plane 2021 according to the embodiment of the present disclosure, and FIG. 16 is a schematic diagram of a lower layer structure of the coil unit 202B on the second plane 2022 according to this embodiment of the present disclosure.

The coil unit 202B in this embodiment is similar to the coil unit 202A described above. Their difference is that, in this embodiment, the coil unit 202B further includes an electrical connecting portion 225 which is connected to an end of the innermost turn of the first spiral structure of the first metal wire 211. Based on the structural design of this embodiment, the coil unit 202B can be directly electrically connected to an external circuit through the electrical connecting portion 225, so as to increase the convenience of testing the coil unit 202B.

Figure 17:
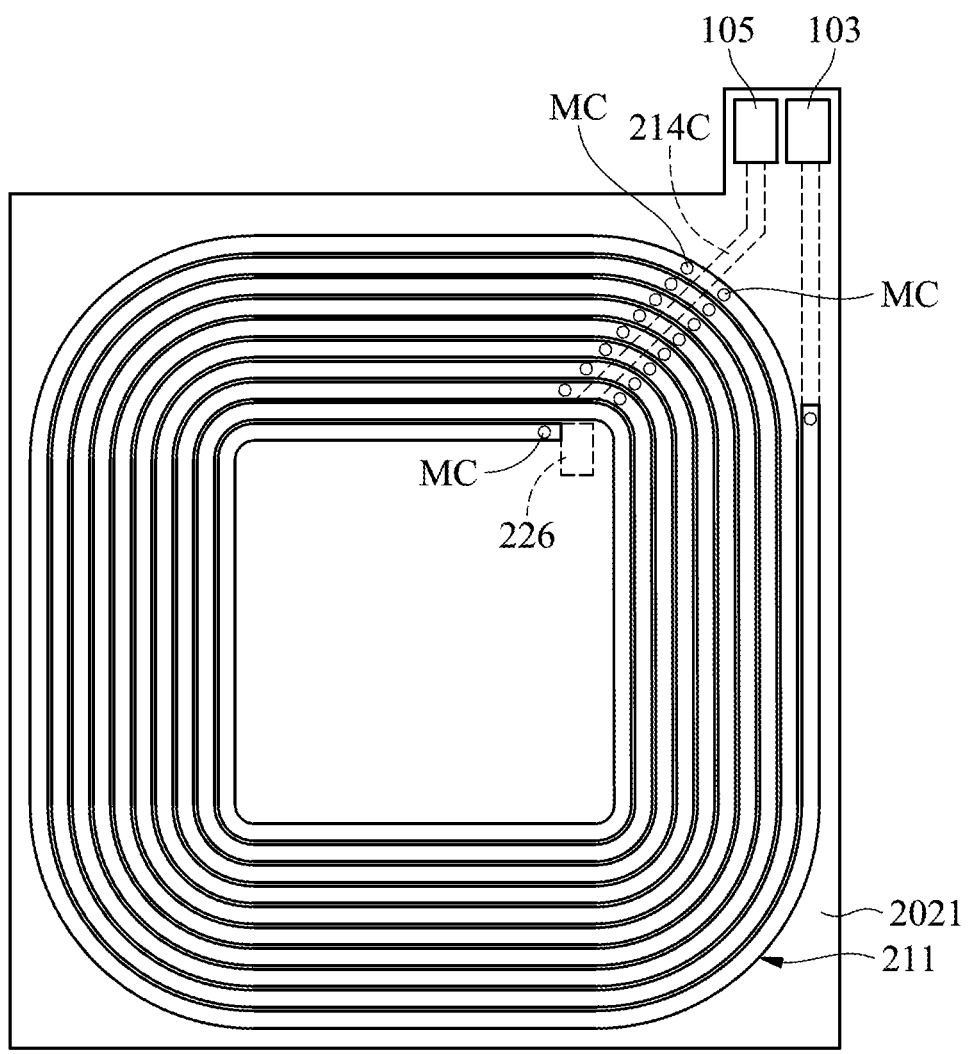
FIG. 17 is a top view of a coil unit of a wireless device according to another embodiment of the present disclosure.
Figure 18:
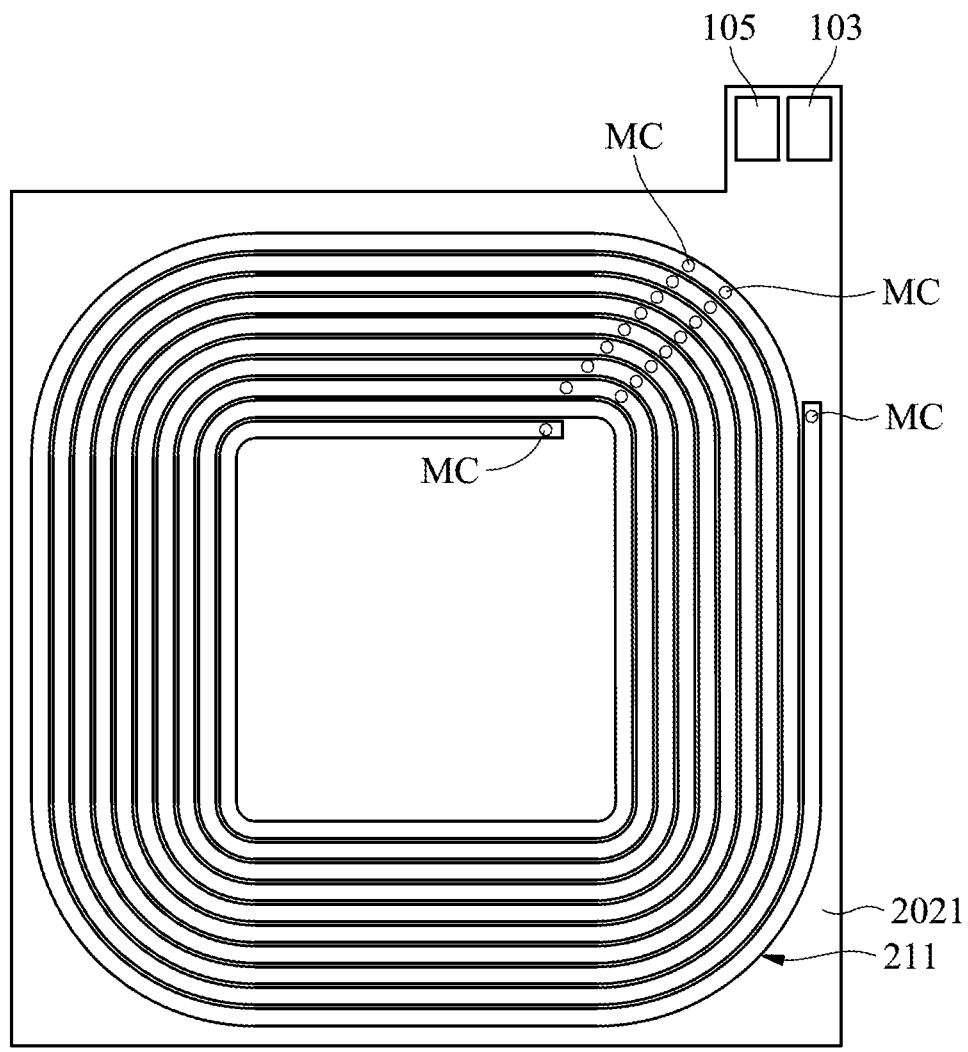
FIG. 18 is a schematic diagram of an upper layer structure of the coil unit on the first plane according to the embodiment of the present disclosure.
Figure 19:
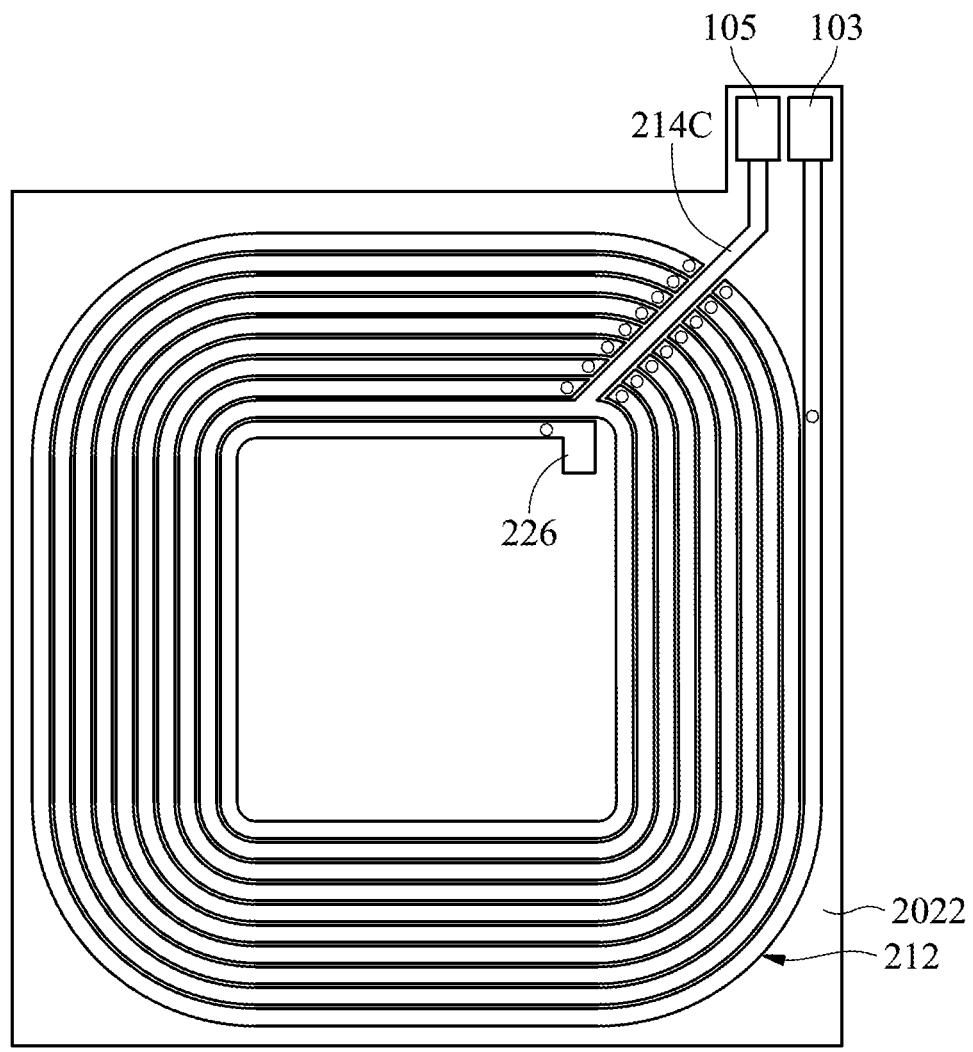
FIG. 19 is a schematic diagram of a lower layer structure of the coil unit on the second plane according to this embodiment of the present disclosure.

Please refer to FIG. 17 to FIG. 19, FIG. 17 is a top view of a coil unit 202C of a wireless device according to another embodiment of the present disclosure, FIG. 18 is a schematic diagram of an upper layer structure of the coil unit 202C on the first plane 2021 according to the embodiment of the present disclosure, and FIG. 19 is a schematic diagram of a lower layer structure of the coil unit 202C on the second plane 2022 according to this embodiment of the present disclosure.

The coil unit 202C of this embodiment is similar to the coil unit 202B described above. Their difference is that, in this embodiment, the coil unit 202C has an electrical connecting portion 226 which is connected to the last turn of the second spiral structure of the second metal wire 212. In addition, the coil unit 202C further includes a first connecting member 214C, and the first connecting member 214C does not cut off a portion of the second spiral structure. Specifically, the first connecting member 214C does not cut off the innermost turn (the last turn) of the second spiral structure, and the first connecting member 214C is connected to the penultimate turn of the second spiral structure.

Based on the structural design of this embodiment, the coil unit 202C can be directly electrically connected to an external circuit by the electrical connecting portion 226, for example, connected to a test device so as to increase the convenience of testing the coil unit 202C. In addition, a plurality of coil units 202C may be connected to a control chip through their respective electrical connecting portions 226, and the control chip may control the ways of connection among the plurality of coil units 202C, for example, in series or in parallel.

Figure 20:
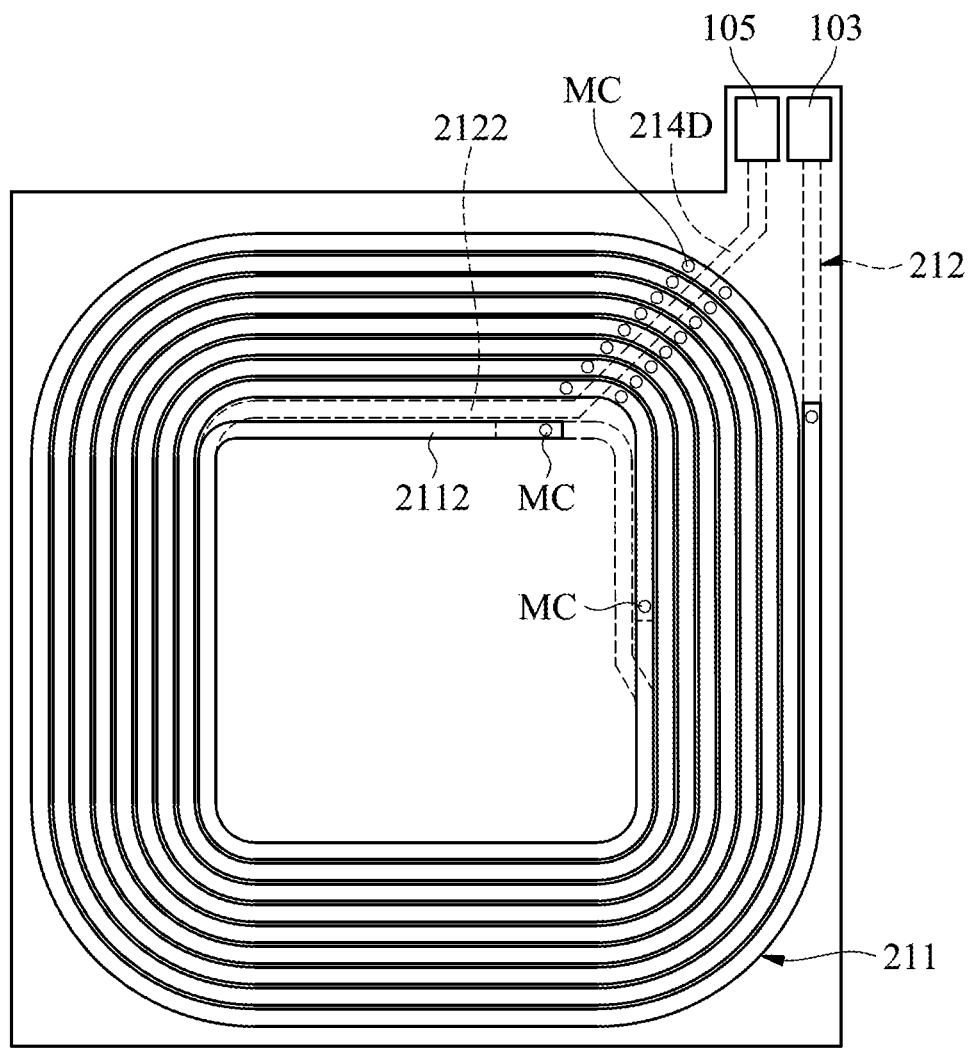
FIG. 20 is a top view of a coil unit of a wireless device according to another embodiment of the present disclosure.
Figure 21:
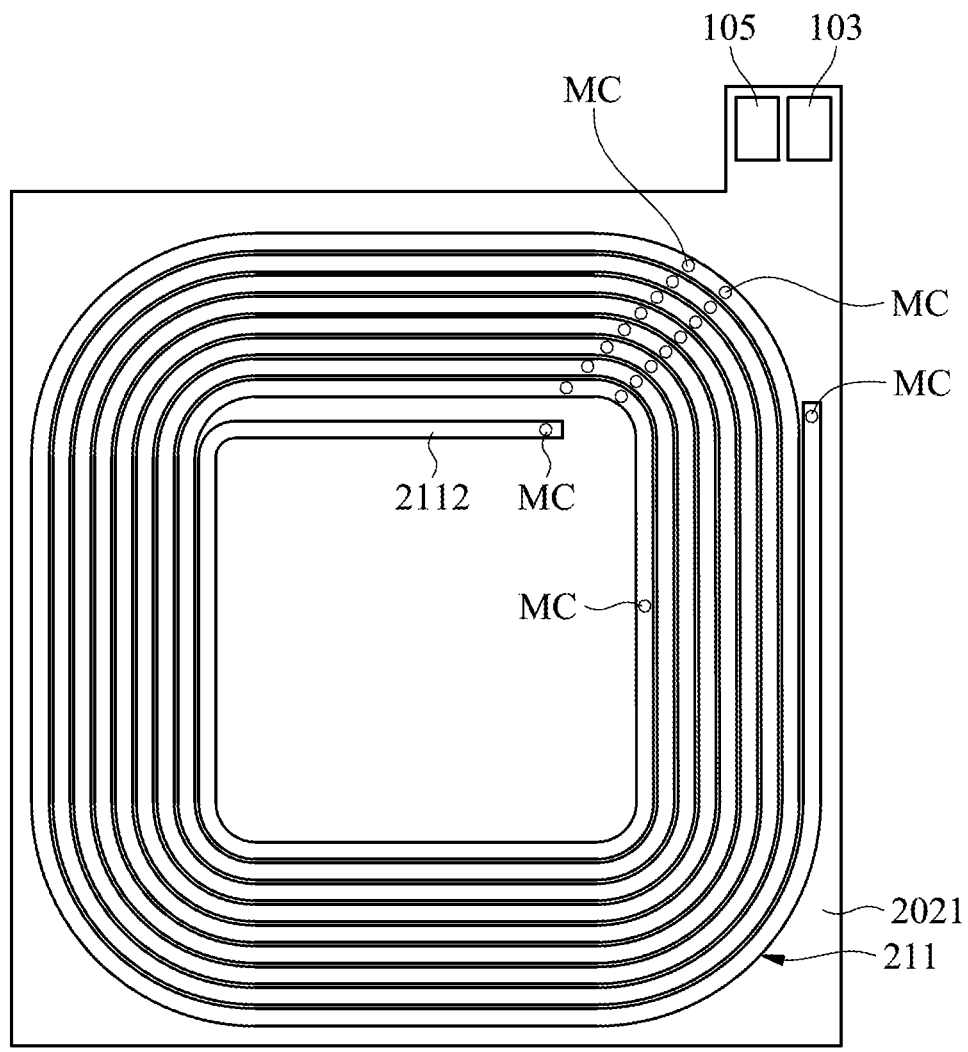
FIG. 21 is a schematic diagram of an upper layer structure of the coil unit on the first plane according to the embodiment of the present disclosure.
Figure 22:
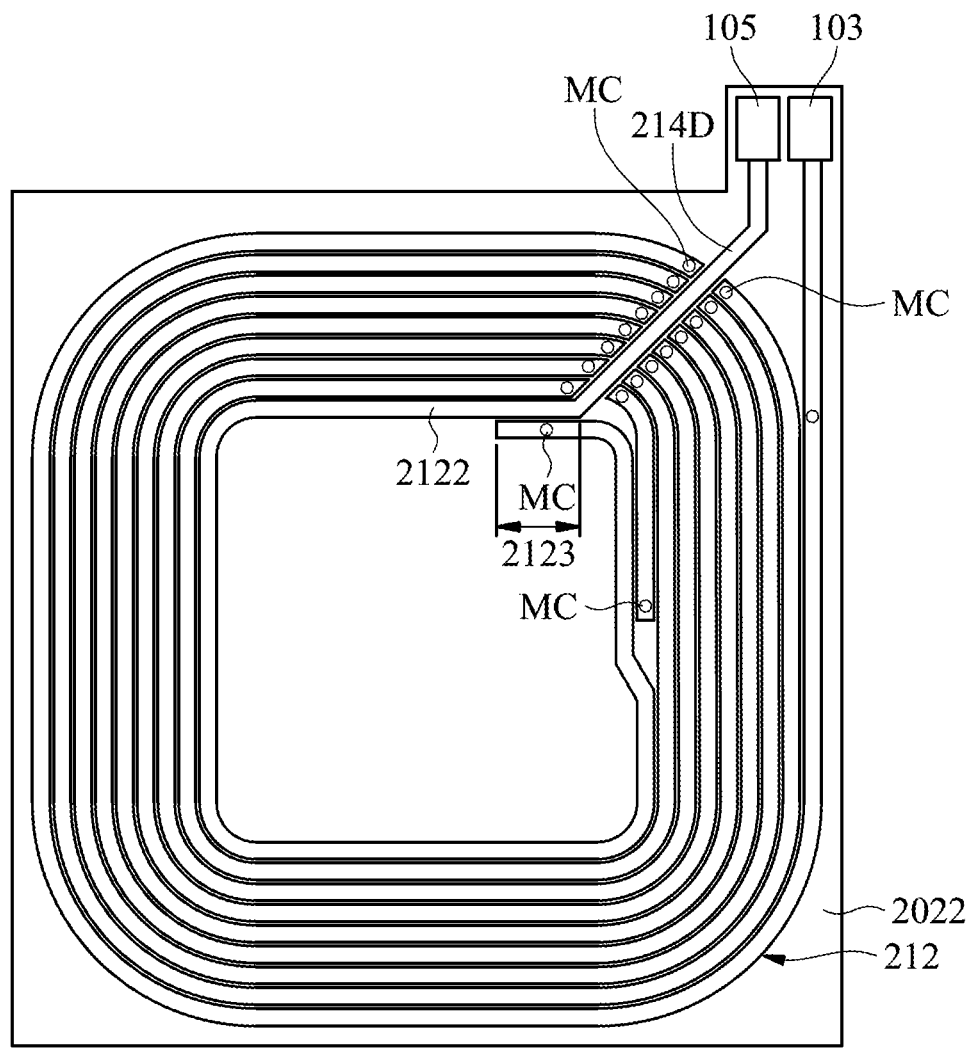
FIG. 22 is a schematic diagram of a lower layer structure of the coil unit on the second plane according to this embodiment of the present disclosure.

Please refer to FIG. 20 to FIG. 22, FIG. 20 is a top view of a coil unit 202D of a wireless device according to another embodiment of the present disclosure, FIG. 21 is a schematic diagram of an upper layer structure of the coil unit 202D on the first plane 2021 according to the embodiment of the present disclosure, and FIG. 22 is a schematic diagram of a lower layer structure of the coil unit 202D on the second plane 2022 according to this embodiment of the present disclosure.

The coil unit 202D in this embodiment is similar to the coil unit 202C described above. In this embodiment, a first connecting member 214D of the coil unit 202D is connected to the penultimate loop 2122 of the second spiral structure of the second metal wire 212 (e.g., as shown in FIG. 22). It should be noted that, the difference between this embodiment and the foregoing embodiment is that, as shown in FIG. 20, when viewed in a direction perpendicular to the first plane 2021, the innermost turn 2112 of the first spiral structure of the first metal wire 211 partially overlap the penultimate turn 2122 of the second spiral structure.

In this embodiment, an innermost turn 2123 of the second metal wire 212 and the innermost turn 2112 of the first metal wire 211 are connected in series, so that the overall resistance of the coil unit 202D can be reduced, thereby reducing the loss due to Eddy current.

Figure 23:
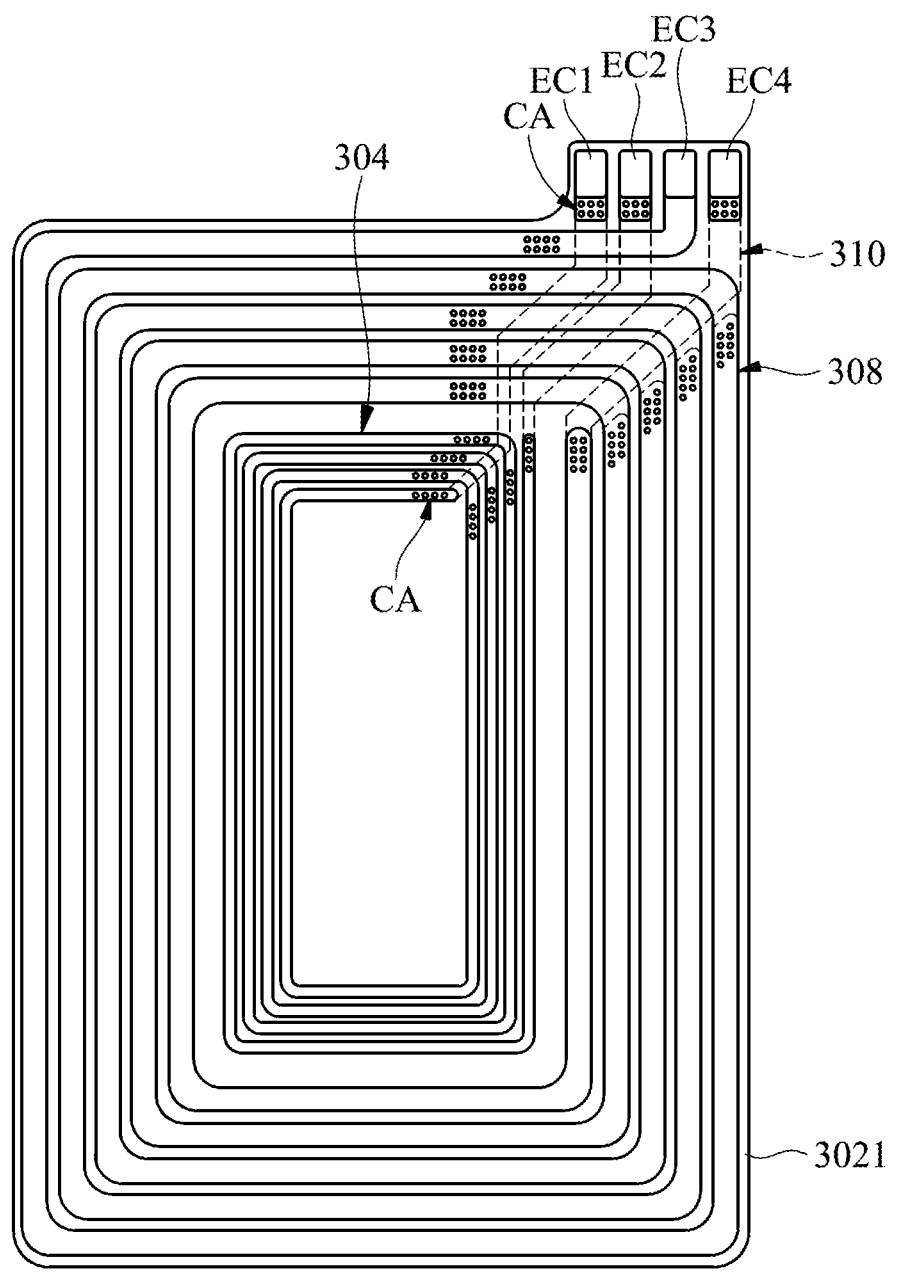
FIG. 23 is a top view of a coil unit of a wireless device according to another embodiment of the present disclosure.
Figure 24:
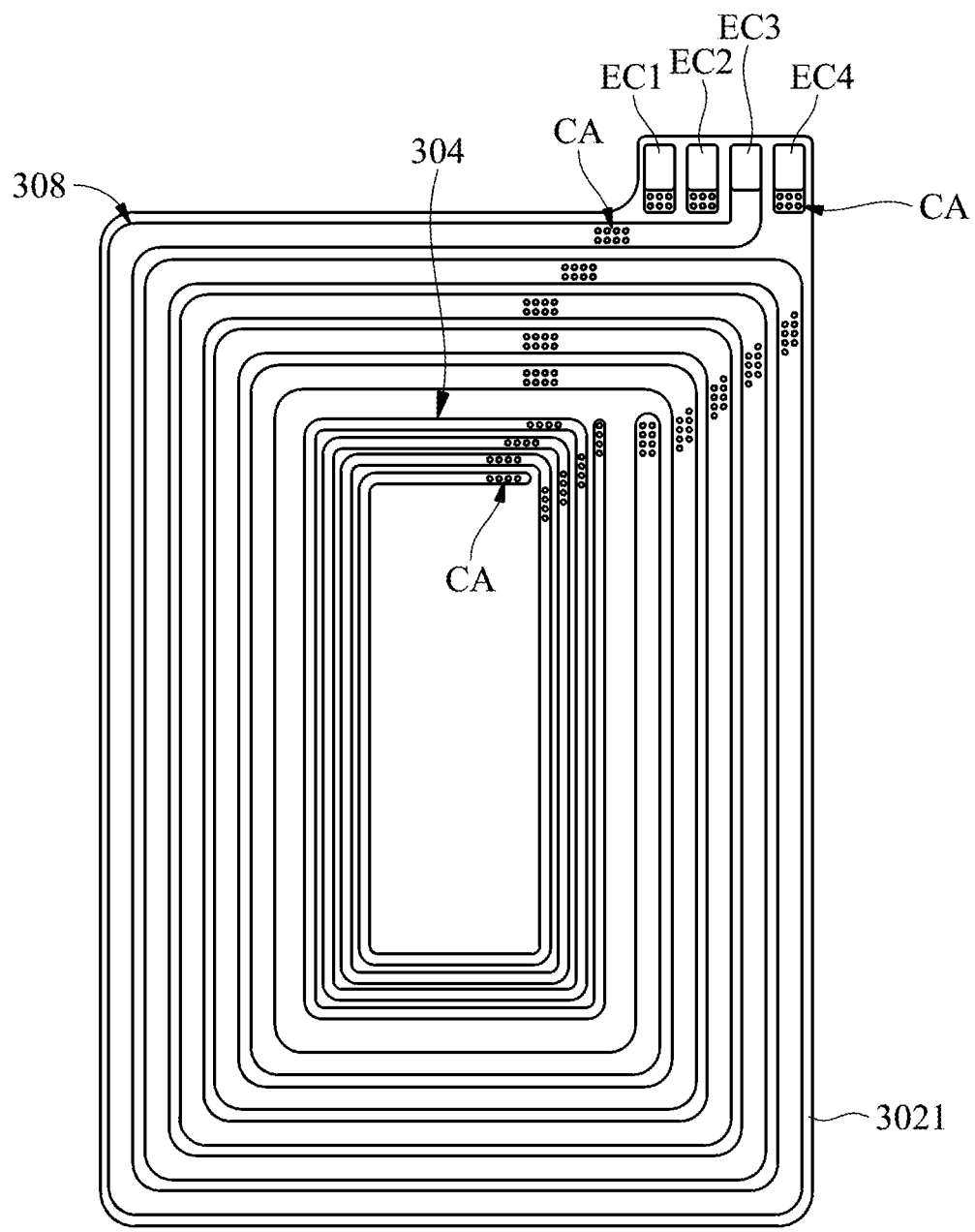
FIG. 24 is a schematic diagram of an upper layer structure of the coil unit on a first plane according to the embodiment of the present disclosure.
Figure 25:
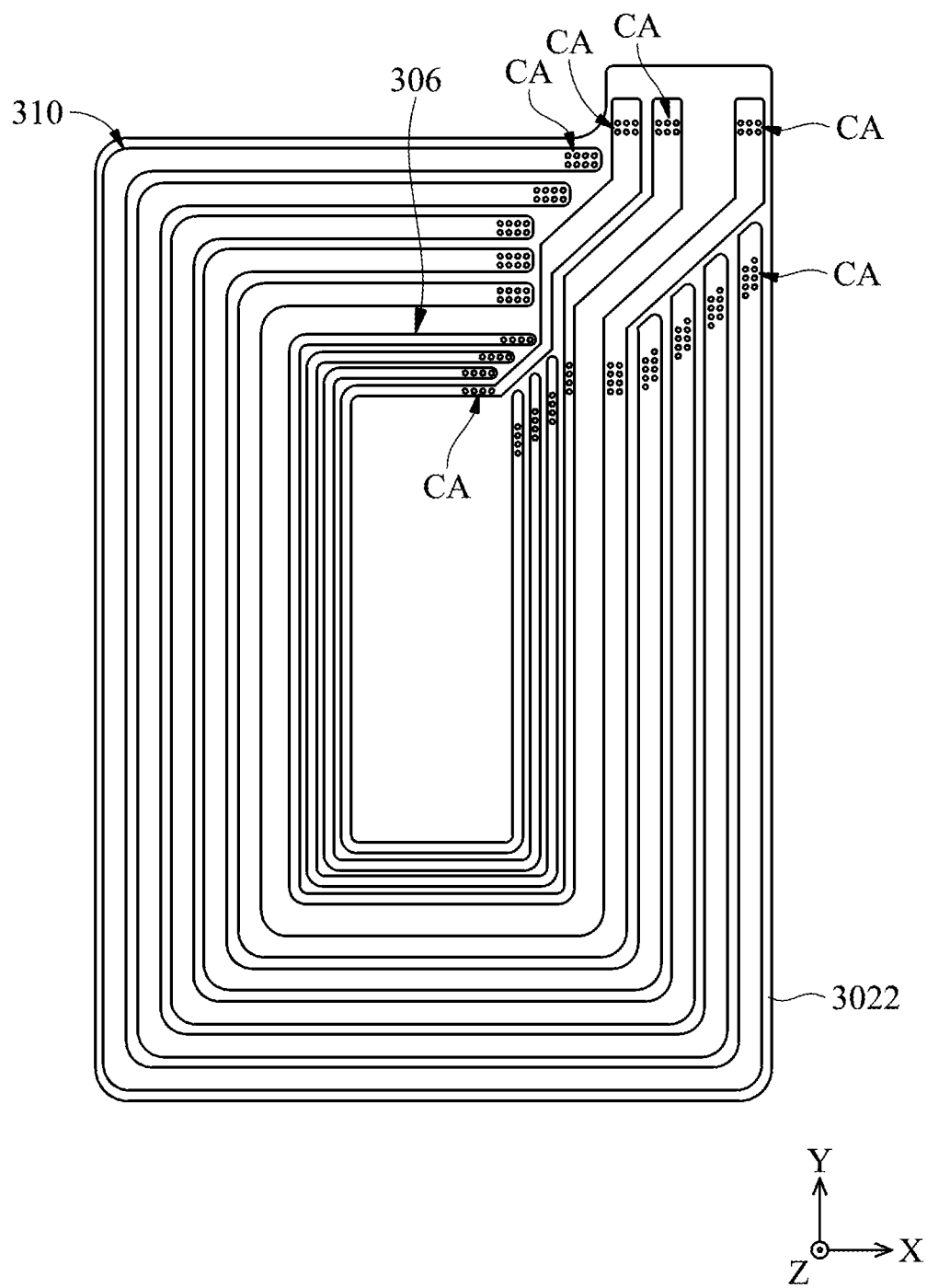
FIG. 25 is a schematic diagram of a lower layer structure of the coil unit on a second plane according to this embodiment of the present disclosure.

Please refer to FIG. 23 to FIG. 25. FIG. 23 is a top view of a coil unit 302 of a wireless device according to another embodiment of the present disclosure, FIG. 24 is a schematic diagram of an upper layer structure of the coil unit 302 on a first plane 3021 according to the embodiment of the present disclosure, and FIG. 25 is a schematic diagram of a lower layer structure of the coil unit 302 on a second plane 3022 according to this embodiment of the present disclosure.

In this embodiment, the coil unit 302 of the wireless device includes a first coil and a second coil. The first coil includes a first metal wire 304 and a second metal wire 306 which are respectively disposed on the first plane 3021 and the second plane 3022. In addition, the second coil includes a third metal wire 308 and a fourth metal wire 310. The third metal wire 308 is disposed on the first plane 3021 and surrounds the first metal wire 304, and the fourth metal wire 310 is disposed on the second plane 3022 and surrounds the second metal wire 306.

In this embodiment, the first metal wire 304 is electrically connected to the second metal wire 306 by a plurality of conductive assemblies CA, and the second metal wire 306 is electrically connected to an electrical contact EC1 and an electrical contact EC2 by two conductive assemblies CA, so that the first coil is electrically connected to an external circuit via the electrical contact EC1 and the electrical contact EC2. The third metal wire 308 can be electrically connected to the fourth metal wire 310 by a plurality of conductive assemblies CA. Furthermore, the third metal wire 308 is electrically connected to an electrical contact EC3, and the fourth metal wire 310 is electrically connected to an electrical contact EC4 through the conductive assembly CA, so that the second coil is electrically connected an external circuit.

It should be noted that, in this embodiment, the first coil can operate in a near field communication (NFC) band, and the second coil can operate as the transmitting terminal or the receiving terminal in electrical power transmission, so as to perform a wireless charging function.

Based on the structural design of the coil unit 302, the wireless device can perform the functions of wireless communication and wireless charging at the same time, and the purpose of miniaturization of the wireless device can also be achieved.

Figure 26:
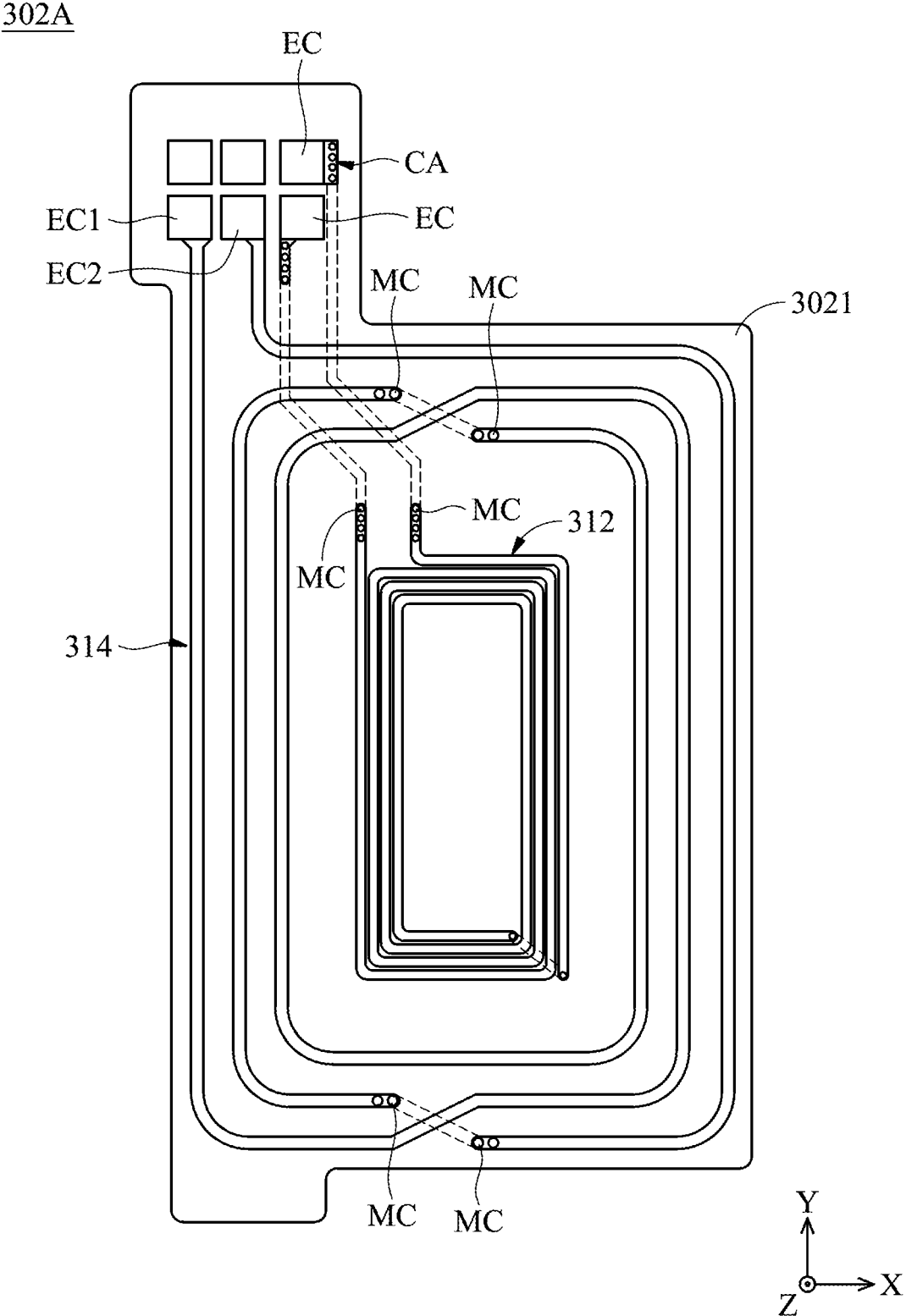
FIG. 26 is a top view of a coil unit of a wireless device according to another embodiment of the present disclosure.
Figure 27:
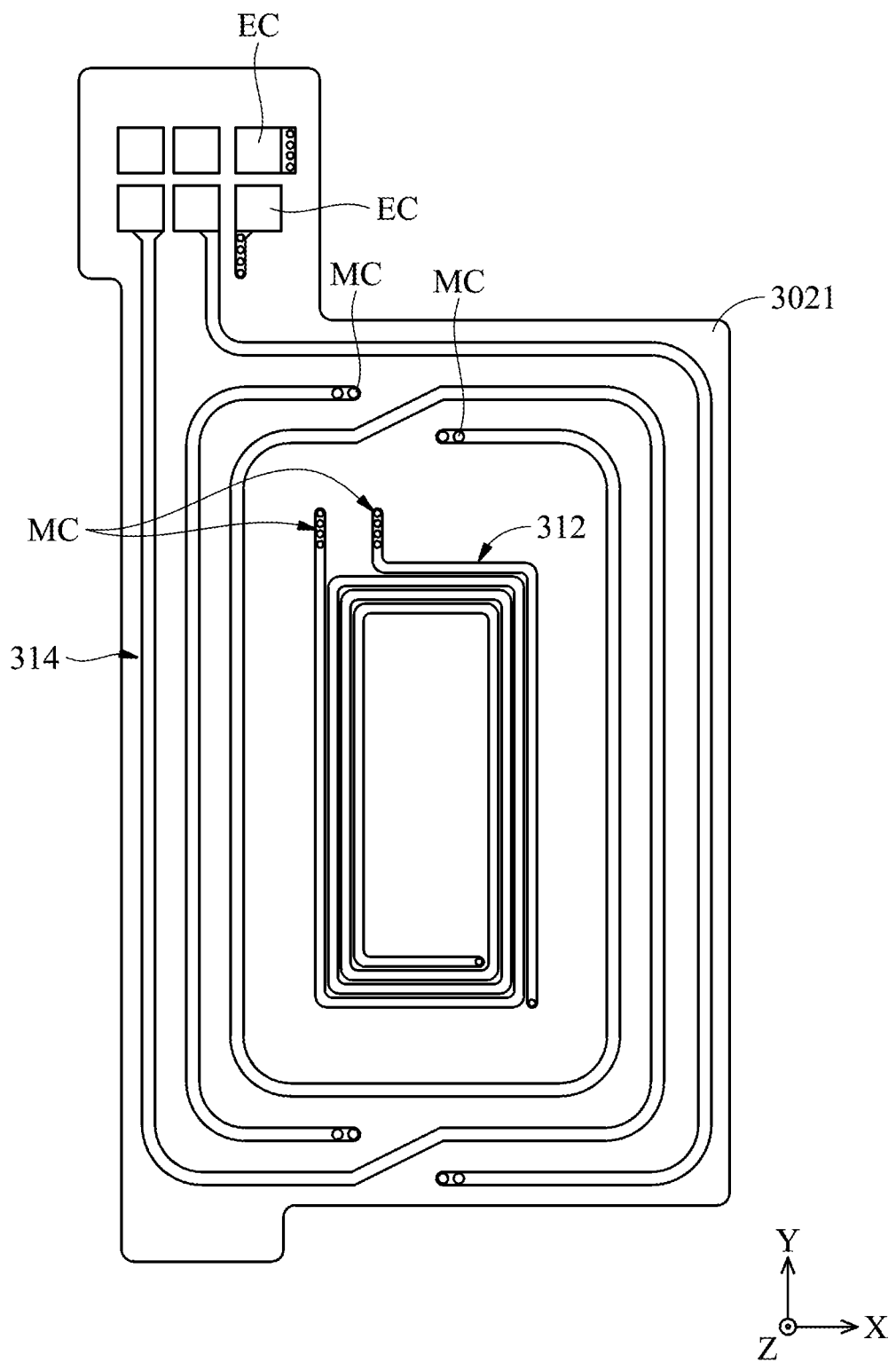
FIG. 27 is a schematic diagram of an upper layer structure of the coil unit on the first plane according to the embodiment of the present disclosure.
Figure 28:
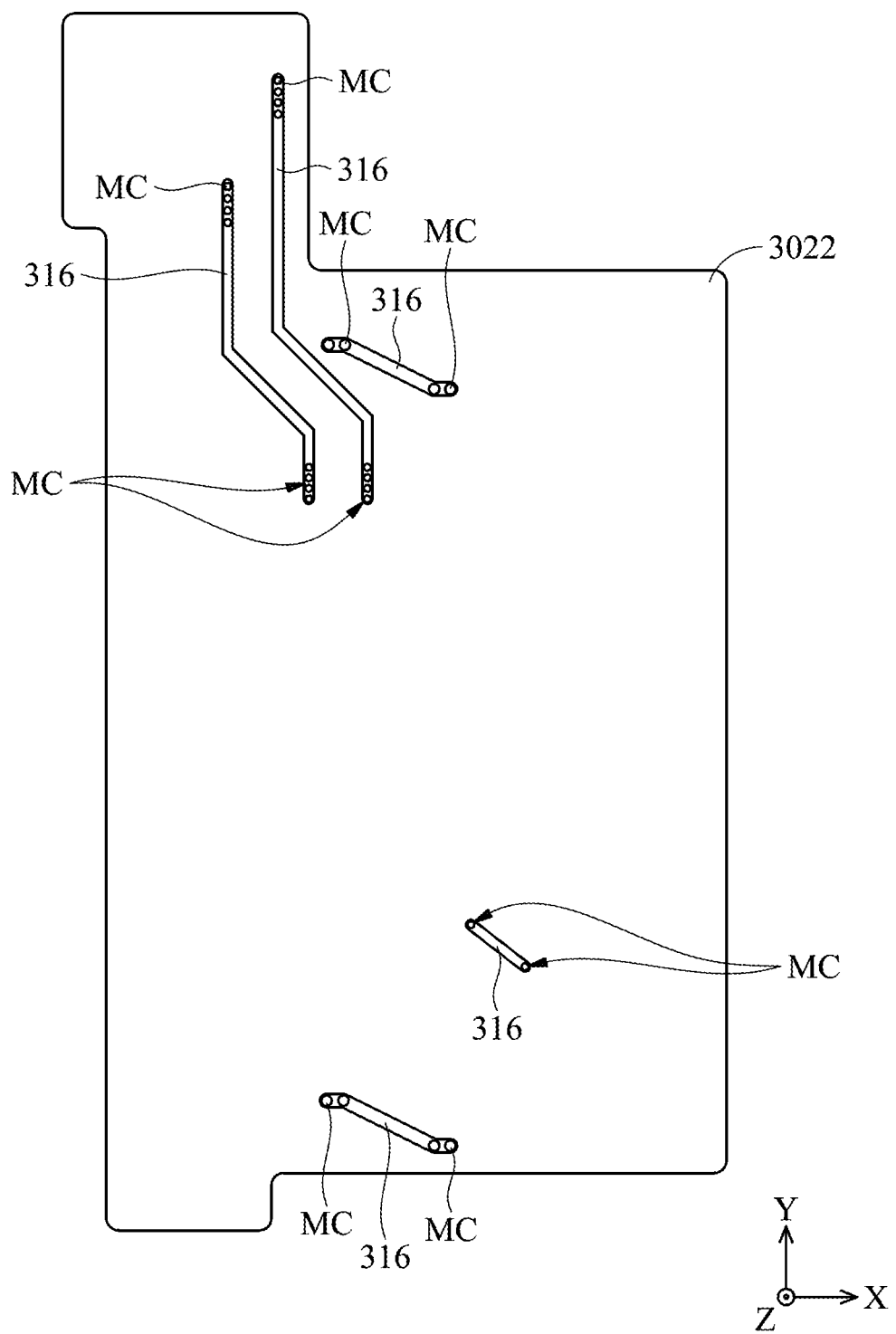
FIG. 28 is a schematic diagram of a lower layer structure of the coil unit on the second plane according to this embodiment of the present disclosure.

Please refer to FIG. 26 to FIG. 28. FIG. 26 is a top view of a coil unit 302A of a wireless device according to another embodiment of the present disclosure, FIG. 27 is a schematic diagram of an upper layer structure of the coil unit 302A on the first plane 3021 according to the embodiment of the present disclosure, and FIG. 28 is a schematic diagram of a lower layer structure of the coil unit 302A on the second plane 3022 according to this embodiment of the present disclosure.

Similar to the coil unit 302, in this embodiment, the coil unit 302A of the wireless device includes a first coil and a second coil, and the first coil includes a first metal wire 312 disposed on the first plane 3021. The second coil includes a second metal wire 314 disposed on the first plane 3021 and surrounding the first metal wire 312, and the second metal wire 314 is electrically connected to the electrical contact EC1 and the electrical contact EC2. The difference between the coil unit 302A and the coil unit 302 is that the coil unit 302A includes a plurality of connecting wires 316 disposed on the second plane 3022. In this embodiment, two connecting wires 316 are configured to connect the first metal wire 312 to the two electrical contacts EC, and the other three connecting wires 316 are configured to be connected to different turns of the second metal wire 314 or the first metal wire 312.

Based on this configuration, the wire layout of the coil unit 302A on the second plane 3022 can be simplified.

The present disclosure provides a wireless device including a coil unit. In some embodiments, the coil unit may include a first coil, and the first coil may further include a first metal wire and a second metal wire. The second metal wire is electrically connected to the first metal wire by at least one conductive assembly, and the conductive assembly can be disposed on the innermost turns of the first metal wire and the second metal wire, so that the current density of the coil unit can be more uniform, and the current is not easily concentrated in a specific portion to generate unnecessary heat energy, thereby improving the overall efficiency.

In addition, in some embodiments, the coil unit may further include a second coil. The first coil can operate in a near field communication (NFC) band, and the second coil can operate as either the transmitting terminal or the receiving terminal in electrical power transmission, so as to perform a wireless charging function. Therefore, the wireless device can perform the functions of wireless communication and wireless charging at the same time.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless device, comprising:
   a first coil comprising:
   a first metal wire, disposed on a first plane and having a first spiral structure; and
   a second metal wire, disposed on a second plane, wherein the second metal wire has a second spiral structure and is electrically connected to the first metal wire; and
   at least one conductive assembly, having at least one metal connector, wherein the conductive assembly is disposed on an innermost turn of the first spiral structure and an innermost turn of the second spiral structure, wherein a width of the innermost turn of the first spiral structure is narrower than a width of the outermost turn of the first spiral structure, and wherein the first spiral structure has an intermediate turn disposed between the innermost turn and the outermost turn, wherein a first slit is formed on the intermediate turn, and the first slit divides the intermediate turn into a left portion and a right portion, and a width of the left portion or the right portion is smaller than the width of the innermost turn of the first spiral structure.

2. The wireless device as claimed in claim 1, further comprising at least three conductive assemblies disposed on a penultimate turn of the first spiral structure and a penultimate turn of the second spiral structure.

3. The wireless device as claimed in claim 2, wherein the distance between every two adjacent metal connectors in the same conductive assembly is substantially equal.

4. The wireless device as claimed in claim 1, further comprising a first connecting member which is separated from the second spiral structure.

5. The wireless device as claimed in claim 4, wherein the first metal wire further includes a separating wire, and the separating wire is separated from the first spiral structure.

6. The wireless device as claimed in claim 5, wherein the separating wire has a long-strip shaped structure, the innermost turn of the first spiral structure has a terminal section, and an extending direction of the terminal section is different from an extending direction of the separating wire.

7. The wireless device as claimed in claim 5, wherein the first spiral structure is coupled to the first connecting member via the second spiral structure and the separating wire in order.

8. The wireless device as claimed in claim 4, wherein a length of the first connecting member is greater than a sum of the width of each turn of the second spiral structure.

9. The wireless device as claimed in claim 4, wherein the second metal wire includes a plurality of straight sections and a plurality of curved sections, and the first connecting member cuts off a portion of the curved sections.

10. The wireless device as claimed in claim 4, wherein when viewed in a direction perpendicular to the first plane, the first connecting member and a terminal end of the first spiral structure form a hollow region.

11. The wireless device as claimed in claim 1, further comprising a first connecting member, and the first connecting member does not cut off a portion of the second spiral structure.

12. The wireless device as claimed in claim 11, wherein the first connecting member does not cut off the innermost turn of the second spiral structure.

13. The wireless device as claimed in claim 1, wherein a width of each successive turn of the first spiral structure gradually increases from the innermost turn to the outermost turn.

14. The wireless device as claimed in claim 1, wherein the first spiral structure includes a plurality of straight sections and a plurality of curved sections, and a width of each curved section is greater than a width of the straight section connected thereto.

15. The wireless device as claimed in claim 14, wherein the first metal wire has a plurality of slits respectively formed on the curved sections.

16. The wireless device as claimed in claim 1, further comprising an electrical connecting portion which is connected to an end of the innermost turn of the first spiral structure.

17. The wireless device as claimed in claim 1, further comprising:
a first connecting member, connected to a penultimate turn of the second spiral structure; and
an electrical connecting portion, connected to the last turn of the second spiral structure.

18. The wireless device as claimed in claim 1, further comprising a first connecting member connected to a penultimate turn of the second spiral structure, and when viewed in a direction perpendicular to the first plane, the innermost turn of the first spiral structure and the penultimate turn of the second spiral structure partially overlap.

19. The wireless device as claimed in claim 1, further comprising a second coil, and the second coil comprising:
a third metal wire, disposed on the first plane and surrounding the first metal wire; and
a fourth metal wire, disposed on the second plane and surrounding the second metal wire;
wherein the first coil operates in a near field communication band, and the second coil operates as a transmitting terminal or a receiving terminal in electrical power transmission.

* * * * *